United States Patent [19]
Liang et al.

[11] Patent Number: 5,347,201
[45] Date of Patent: Sep. 13, 1994

[54] DISPLAY DEVICE

[75] Inventors: Jemm Y. Liang, San Jose; Shichao Ge, Santa Clara, both of Calif.

[73] Assignee: Panocorp Display Systems, Santa Clara, Calif.

[21] Appl. No.: 943,934

[22] Filed: Sep. 11, 1992

Related U.S. Application Data

[63] Continuation-in-part of Ser. No. 657,867, Feb. 25, 1991, Pat. No. 5,170,100, and a continuation-in-part of Ser. No. 730,110, Jul. 15, 1991, Pat. No. 5,229,691, and a continuation-in-part of Ser. No. 812,730, Dec. 23, 1991.

[51] Int. Cl.$^5$ .................. G09G 1/04; H01J 29/70; H01J 1/02
[52] U.S. Cl. .................. 315/366; 313/422; 313/309; 313/336
[58] Field of Search .................. 315/366, 10; 313/422, 313/309, 310, 336

[56] References Cited

U.S. PATENT DOCUMENTS

| | | | |
|---|---|---|---|
| Re. 31,558 | 4/1984 | Sinclair et al. | 313/422 |
| 2,500,929 | 3/1950 | Chilowsky . | |
| 3,855,499 | 12/1974 | Yamada et al. | 313/336 |
| 3,935,499 | 1/1976 | Oess . | |
| 3,935,500 | 1/1976 | Oess et al. . | |
| 4,158,210 | 6/1979 | Watanabe et al. | 315/366 |
| 4,322,656 | 3/1982 | Huber et al. | 313/485 |
| 4,377,769 | 3/1983 | Beatty et al. . | |
| 4,651,049 | 3/1987 | Saeki et al. | 313/422 |
| 4,707,638 | 11/1987 | Hara et al. | 315/366 |
| 4,719,388 | 1/1988 | Oess . | |
| 4,737,683 | 4/1988 | Shichao et al. . | |
| 4,743,798 | 5/1988 | Washington | 313/422 |
| 4,811,017 | 3/1989 | Tsuruoka . | |
| 4,812,716 | 3/1989 | Miyama et al. . | |
| 4,887,000 | 12/1989 | Yamazaki et al. | 313/422 |
| 4,908,539 | 3/1990 | Meyer et al. | 315/169.3 |
| 4,940,916 | 6/1990 | Borel et al. | 313/309 |
| 4,973,888 | 11/1990 | Morimoto et al. | 315/366 |
| 5,063,327 | 11/1991 | Brodie et al. | 313/422 |
| 5,083,058 | 1/1992 | Nonomura et al. | 313/482 |
| 5,113,274 | 5/1992 | Takahashi et al. | 359/66 |
| 5,160,871 | 11/1992 | Tomii et al. | 315/366 |
| 5,170,100 | 12/1992 | Shichao et al. | 315/366 |
| 5,212,426 | 5/1993 | Kane | 313/309 |

FOREIGN PATENT DOCUMENTS 3276542 12/1991 Japan .
3295138 12/1991 Japan .

OTHER PUBLICATIONS

"6–In. Diagonal Microtips Fluorescent Display for T.V. Application," by Meyer, IDRC 90 Proceedings, pp. 374–377.

(List continued on next page.)

Primary Examiner—Gregory C. Issing
Attorney, Agent, or Firm—Majestic, Parsons, Siebert & Hsue

[57] ABSTRACT

This invention is about new cathode structures involving the FEAs (field emitter arrays) and the application of these new cathode structures in EFD (Electron Fluorescent Display), EFLCD (Electron Fluorescent Liquid Crystal Display) and MFD (Microtip Fluorescent Display) type direct matrix addressed type display. One aspect of this invention is related to eliminating the difficulty large area FEA cathode manufacturing by combining the control apparatus of EFD and EFLCD with the efficient electron emission process of the FEA. The second aspect of this invention is related to the employment of local embedded circuit components to help enhancing the uniformity of the electron emitting process of FEA. The preferred embodiments of the invented cathode structure in EFD or EFLCD employ multiple pieces of field emitter arrays sparsely disposed inside a vacuum chamber to generate the electron clouds which is then accelerated and controlled by other control means of EFD or EFLCD structures. The preferred embodiments of the invented cathode structure in MFD variety devices provides the benefit of improved the uniformity, lower the control voltage range and increased duty factor independent by employing various local control circuit configuration in the FEA cathodes.

21 Claims, 18 Drawing Sheets

OTHER PUBLICATIONS

"Field Emitter Arrays Applied to Vacuum Fluorescent Display", by Spindt et al., *IEEE Trans. on Electron Devices*, pp. 225–337, Jan. 1989.

"Field Emission Display-Technoloy Review," Technical Note #01, Coloray Display Corporation, Oct. 1990, pp. 1–8.

"Microtip Field-Emission Display Performance Considerations," by Lowe, SID 92 Digest, pp. 523–526.

"Fabrication and Application of Flat Cathode Using Micron-Sized Field Emitters", Kanemaru et al, Electrotechnical Library, pp. 21–26, IDY92-113.

Hayashi, et al., *A 15-mm Trio Pitch Jumbotron Device*, SID 89 Digest, pp. 98–101.

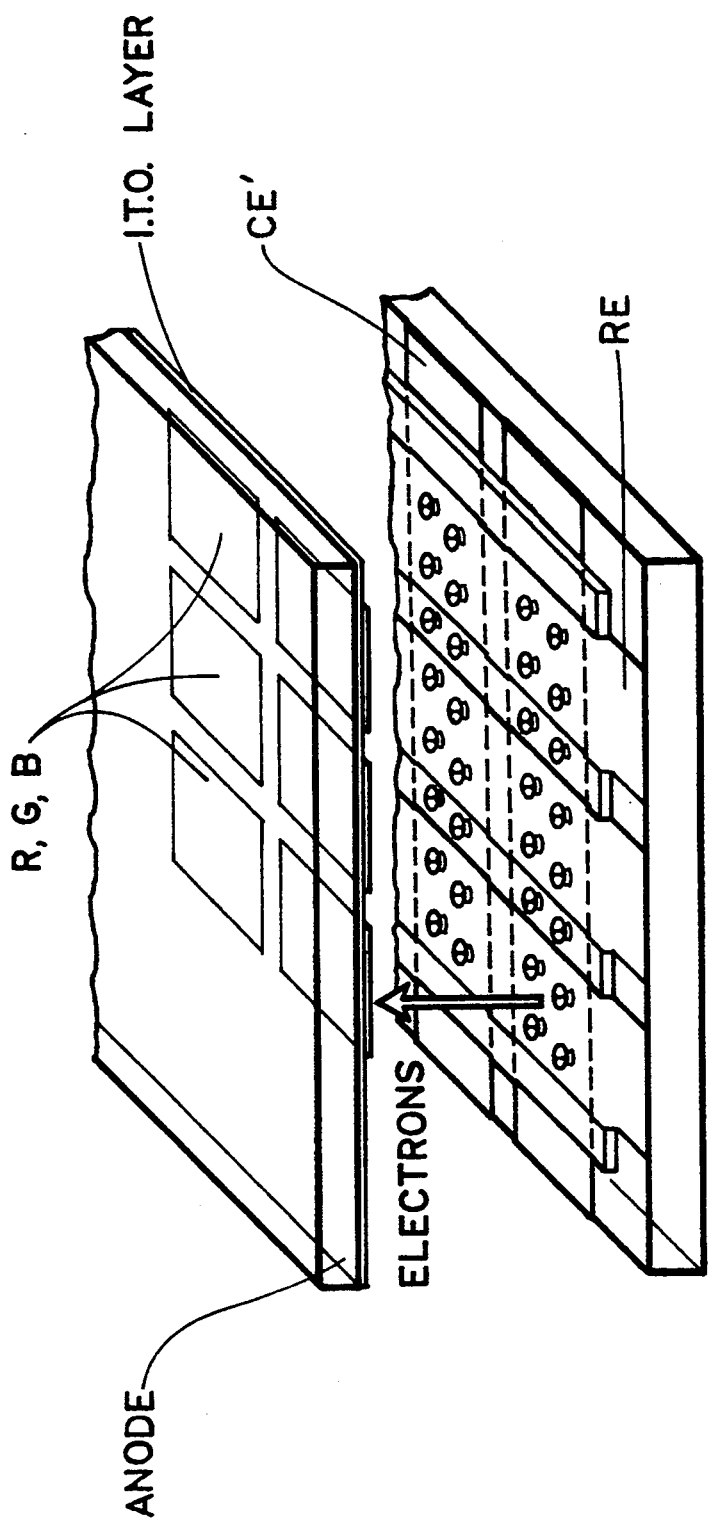
PRIOR ART
FIG._1A.

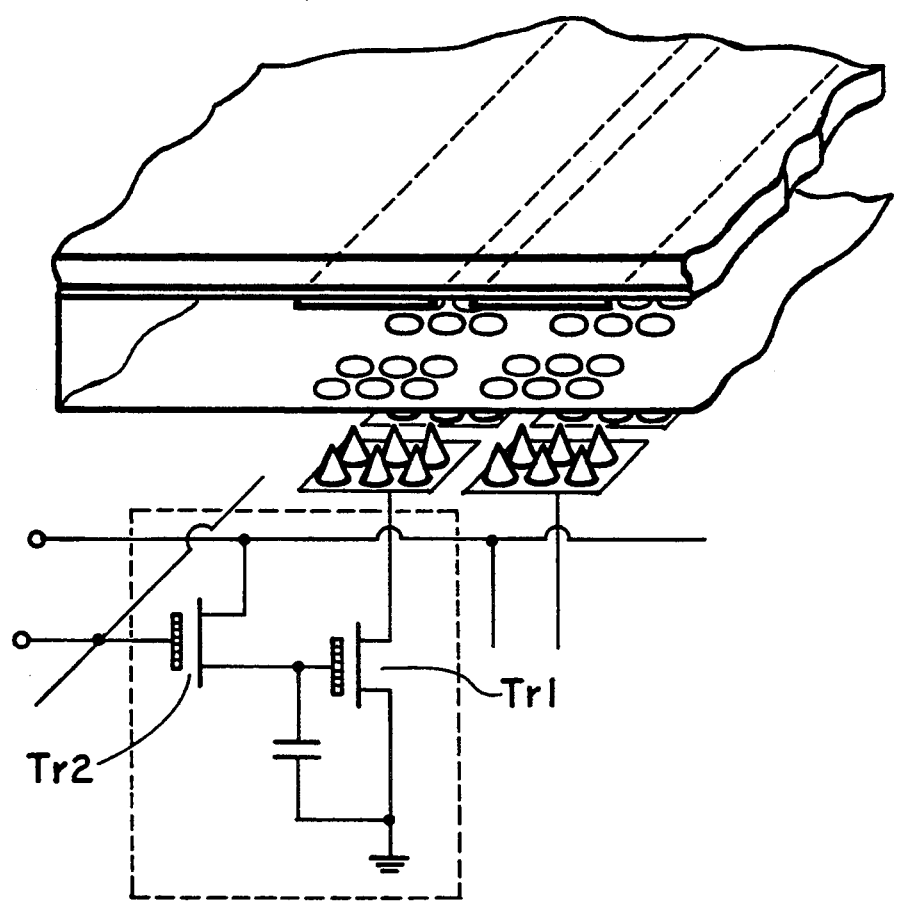
PRIOR ART
FIG._1B.

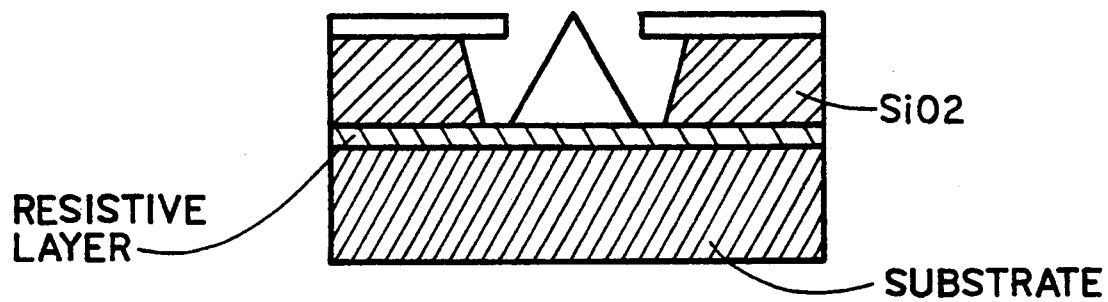
PRIOR ART
FIG.__2A.
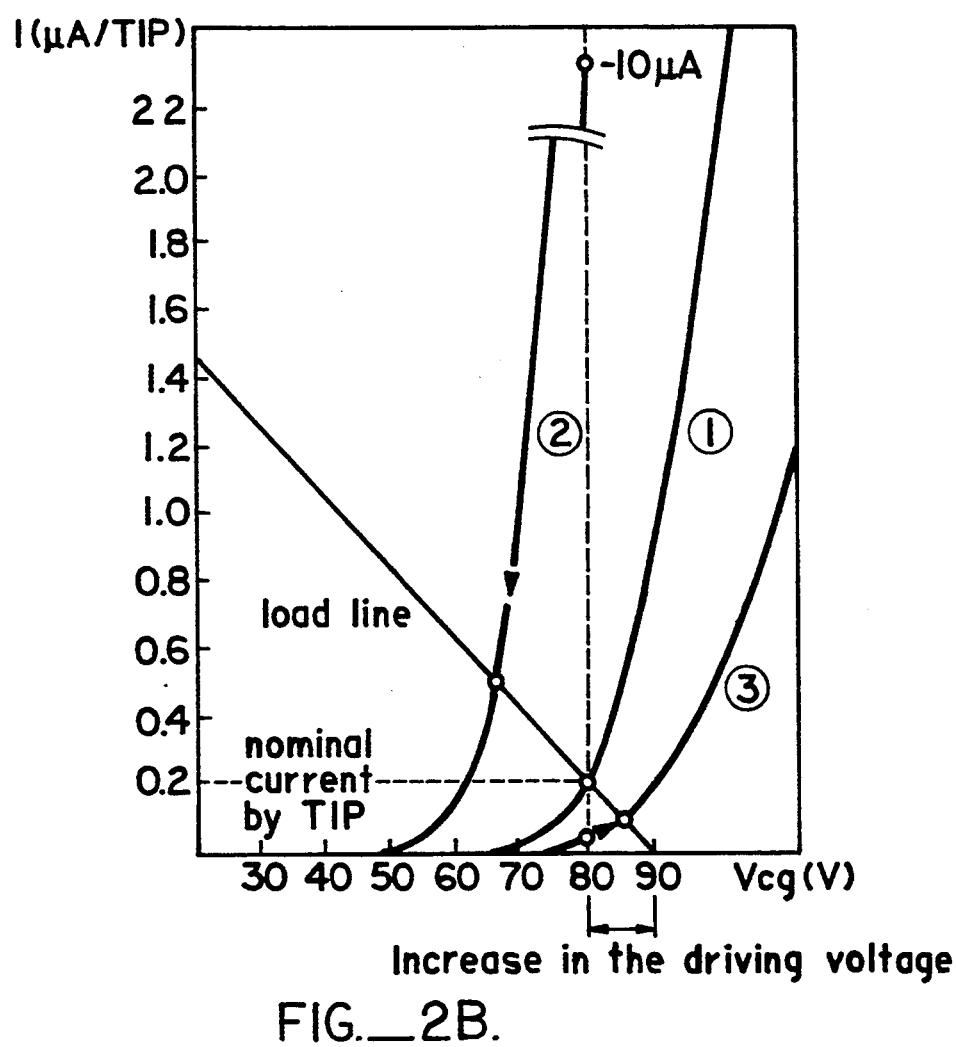
FIG.__2B.

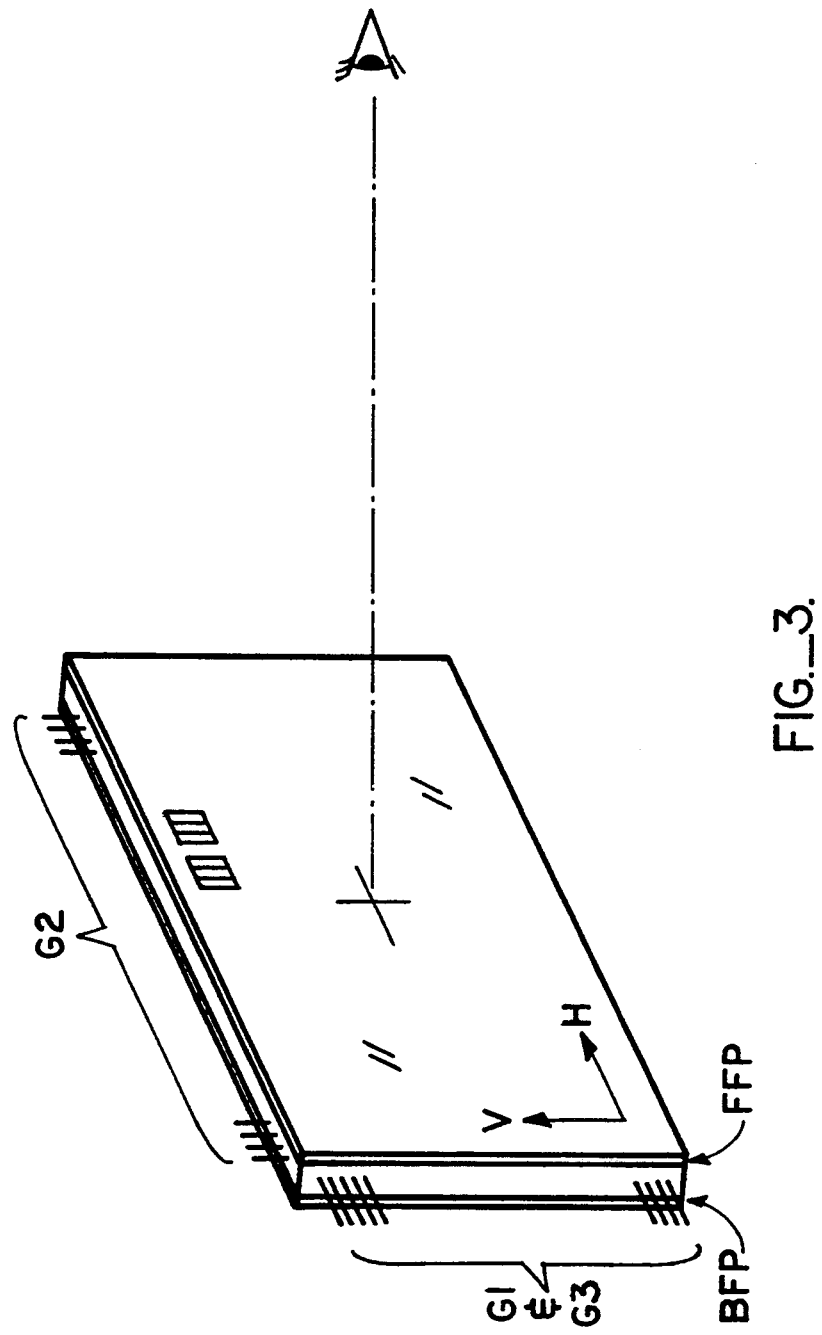
FIG._3.

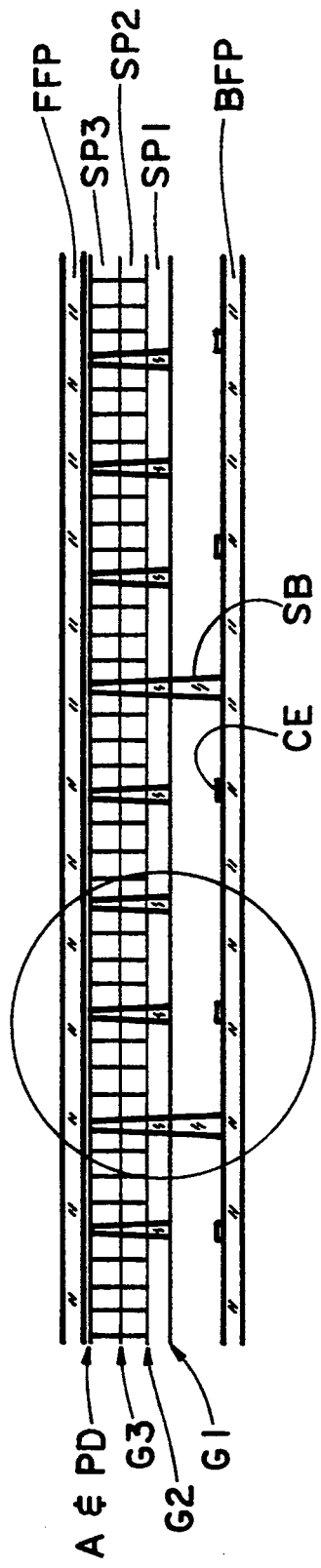
FIG._4A.
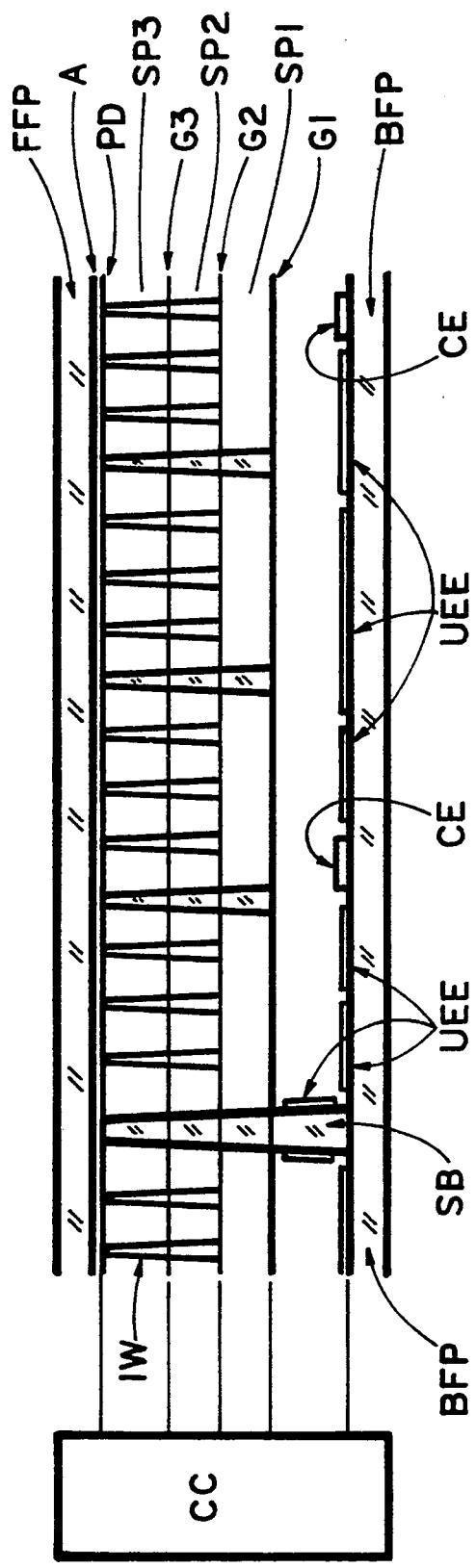
FIG._4B.

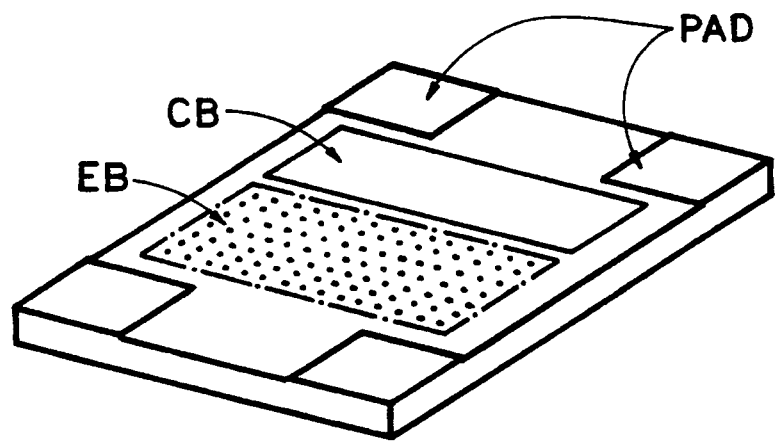
FIG._5A.
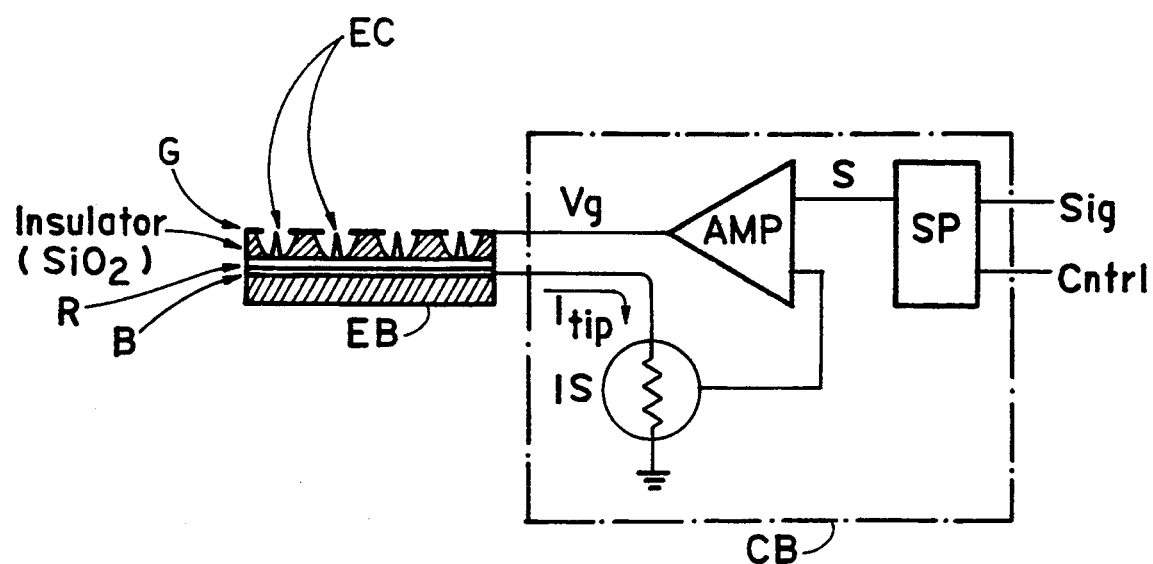
FIG._5B.

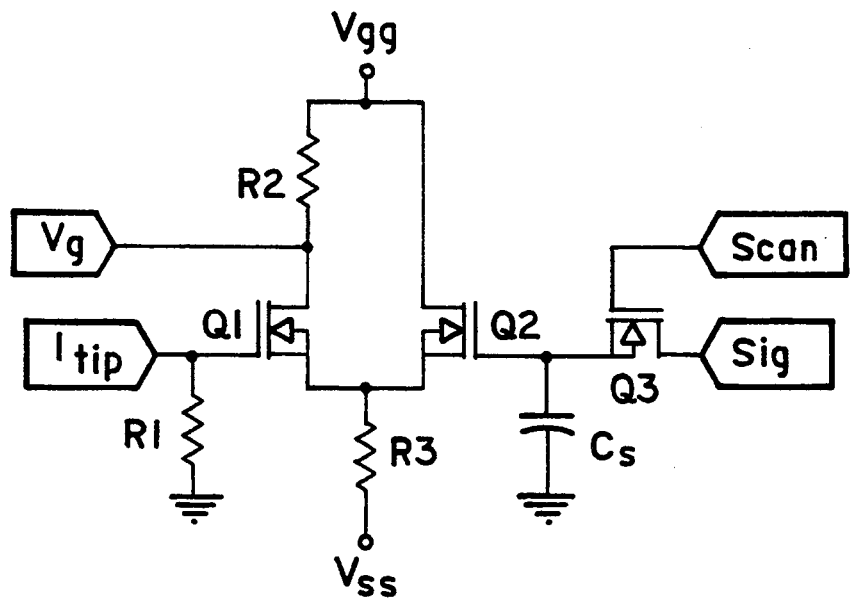
FIG._5C.
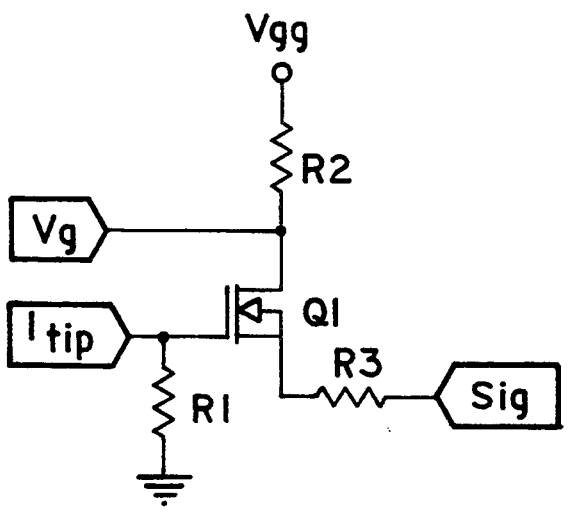
FIG._5D.

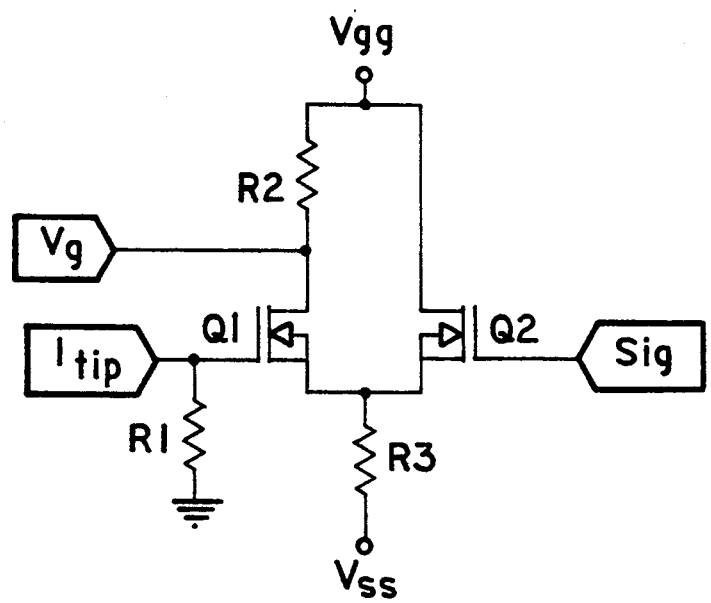
FIG._5E.
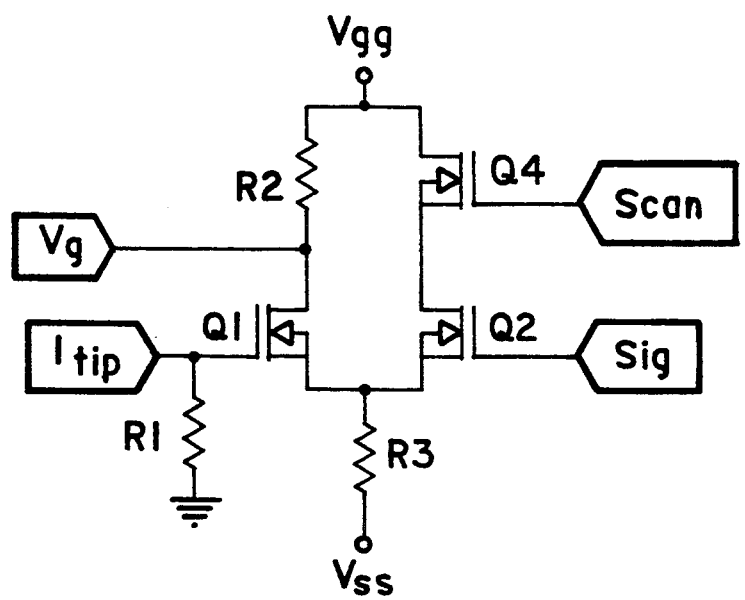
FIG._5F.

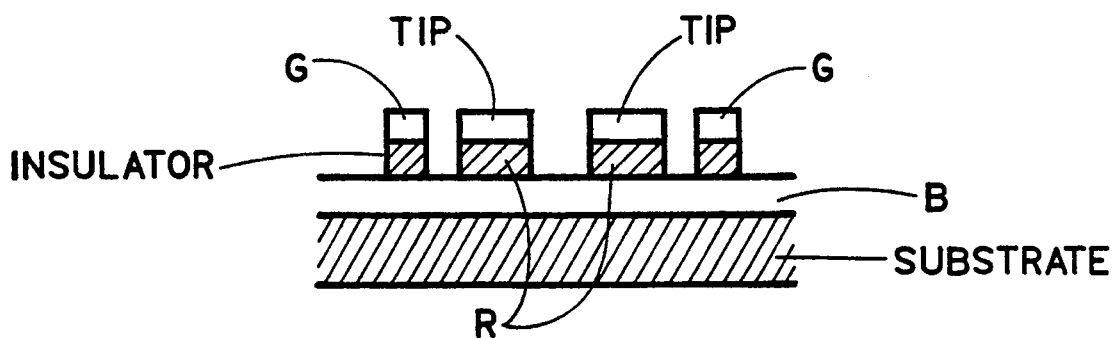
CROSS SECTION VIEW
FIG._6A.
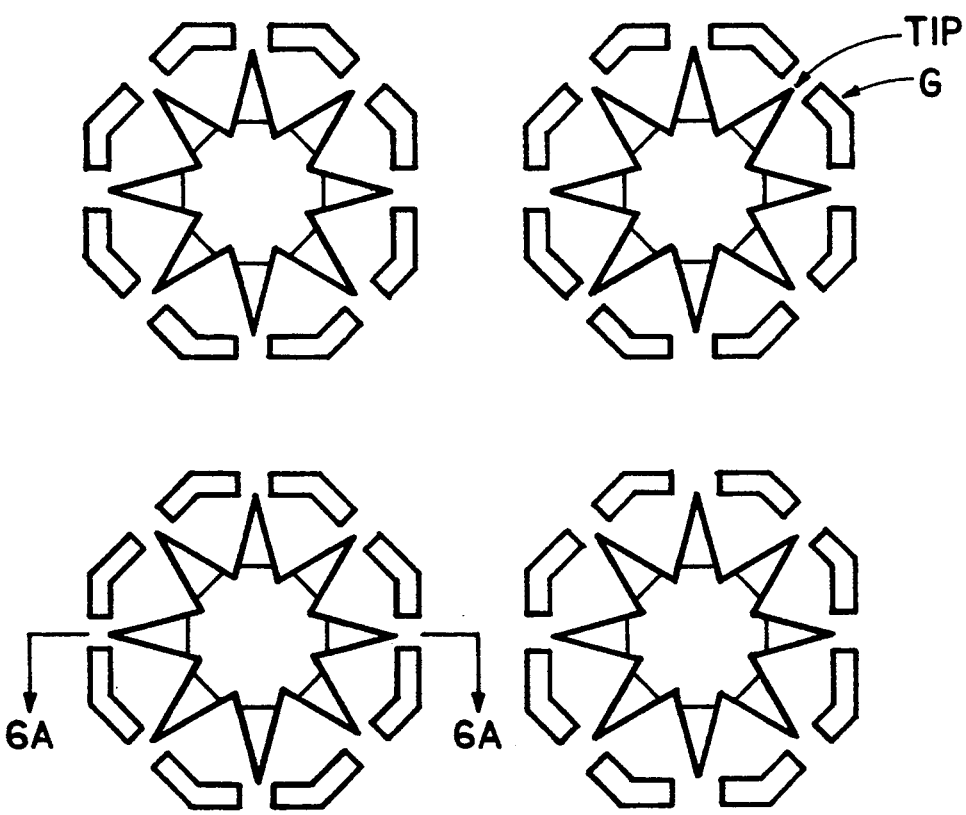
TOP VIEW
FIG._6B.

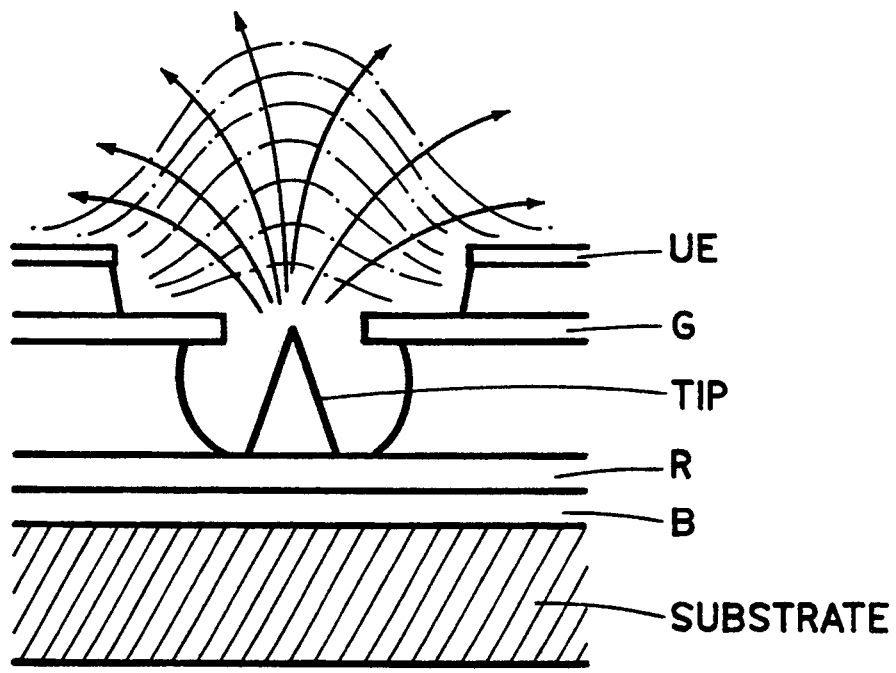
FIG._6C.
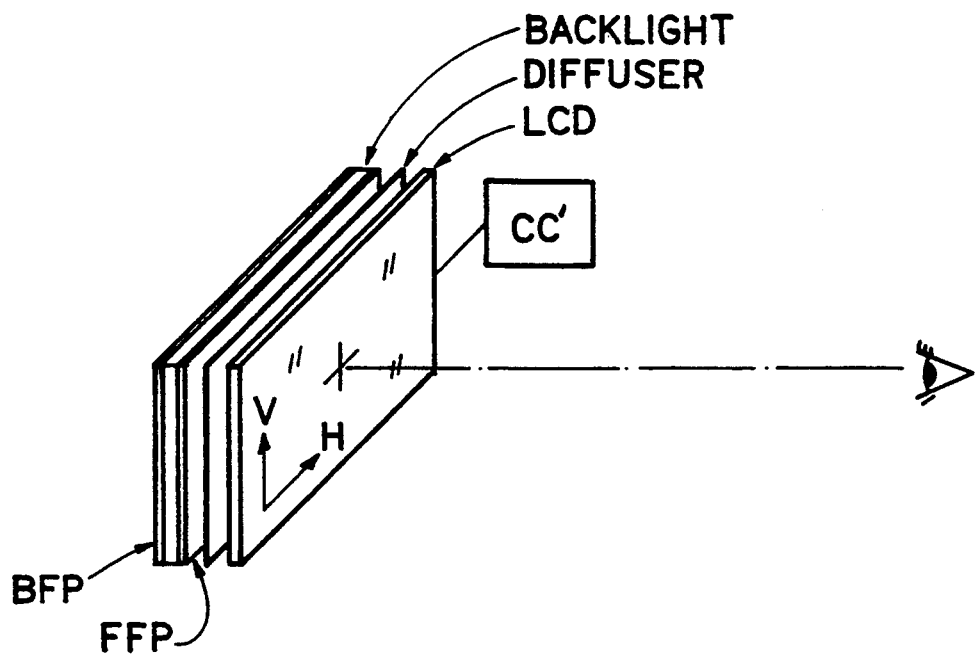
FIG._7.

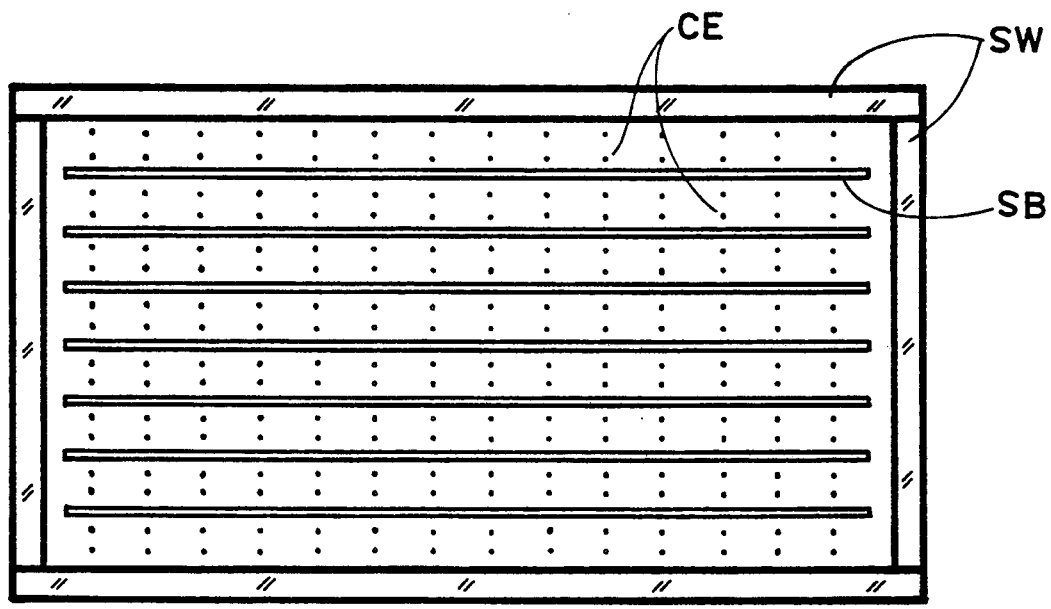
FIG._8.
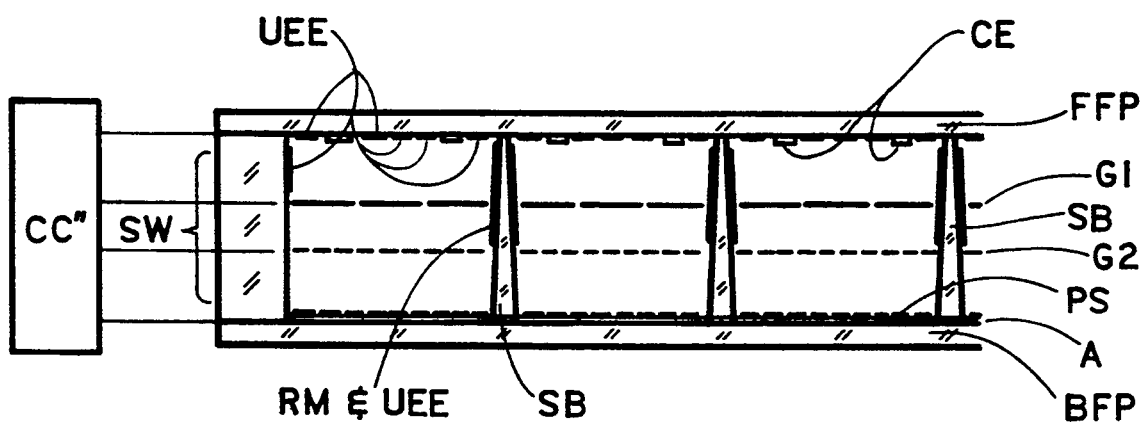
FIG._9.

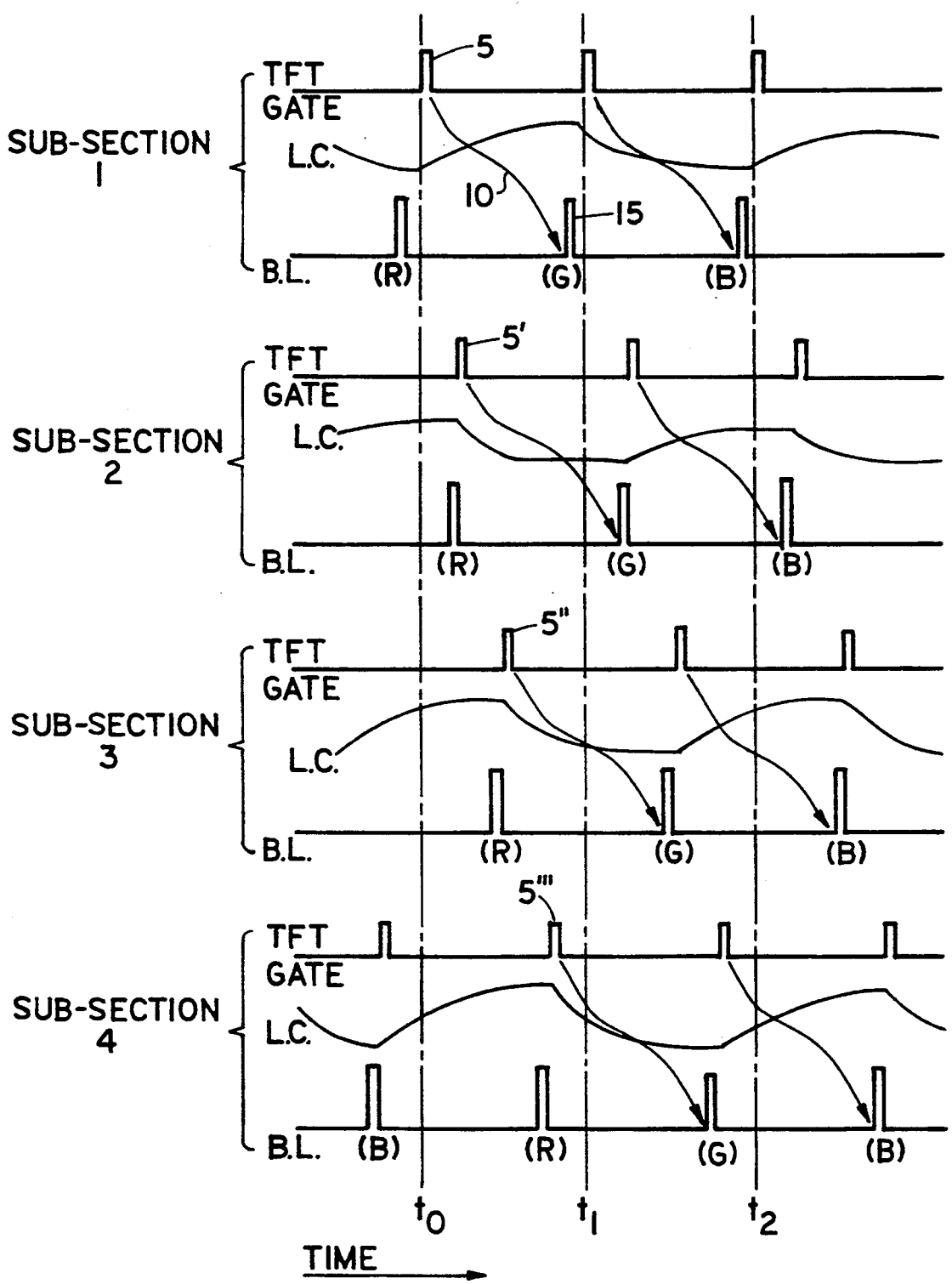
FIG._10.

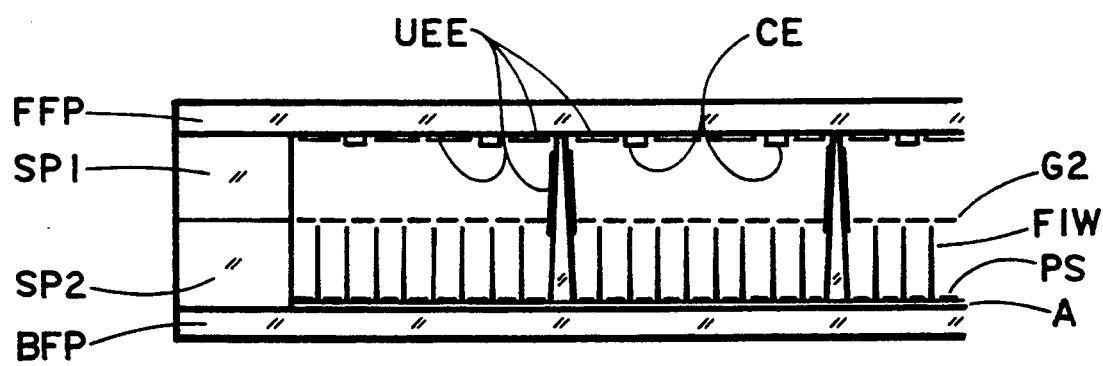
FIG._11.

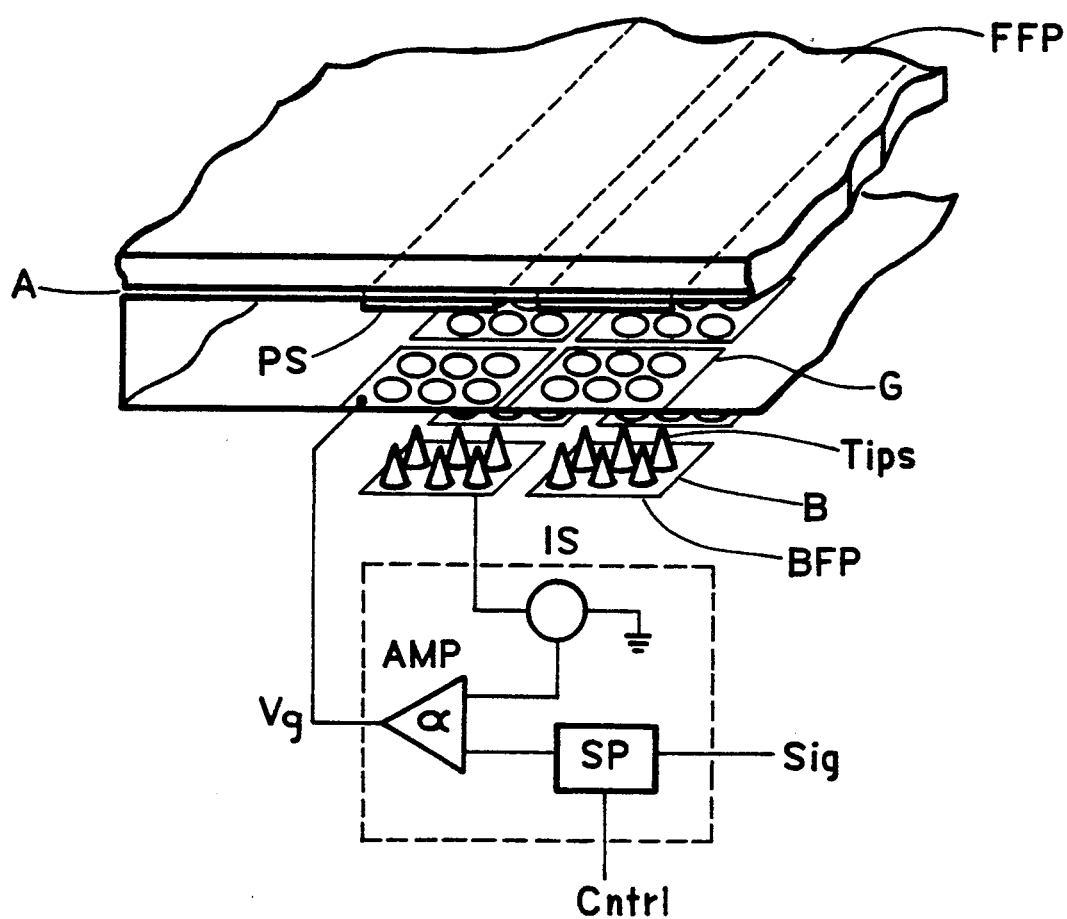
FIG._13A.

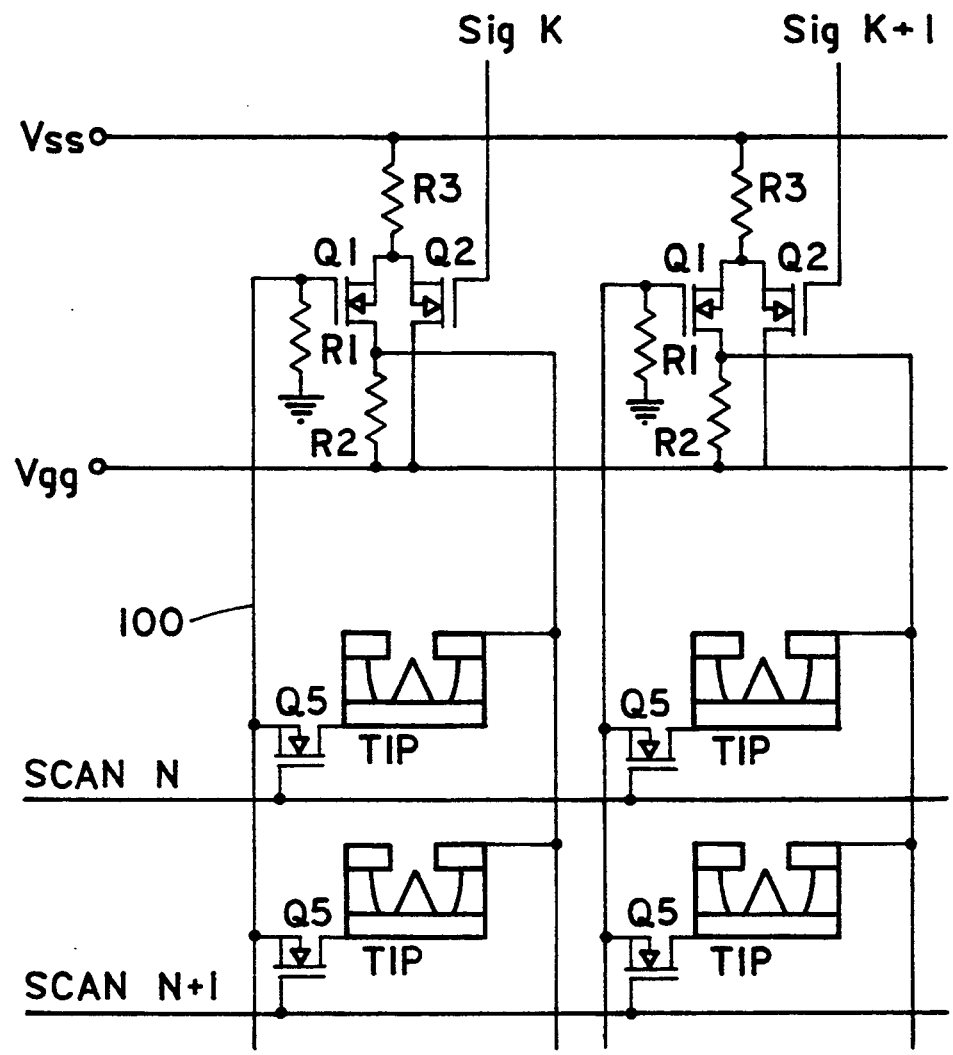
FIG._13B.

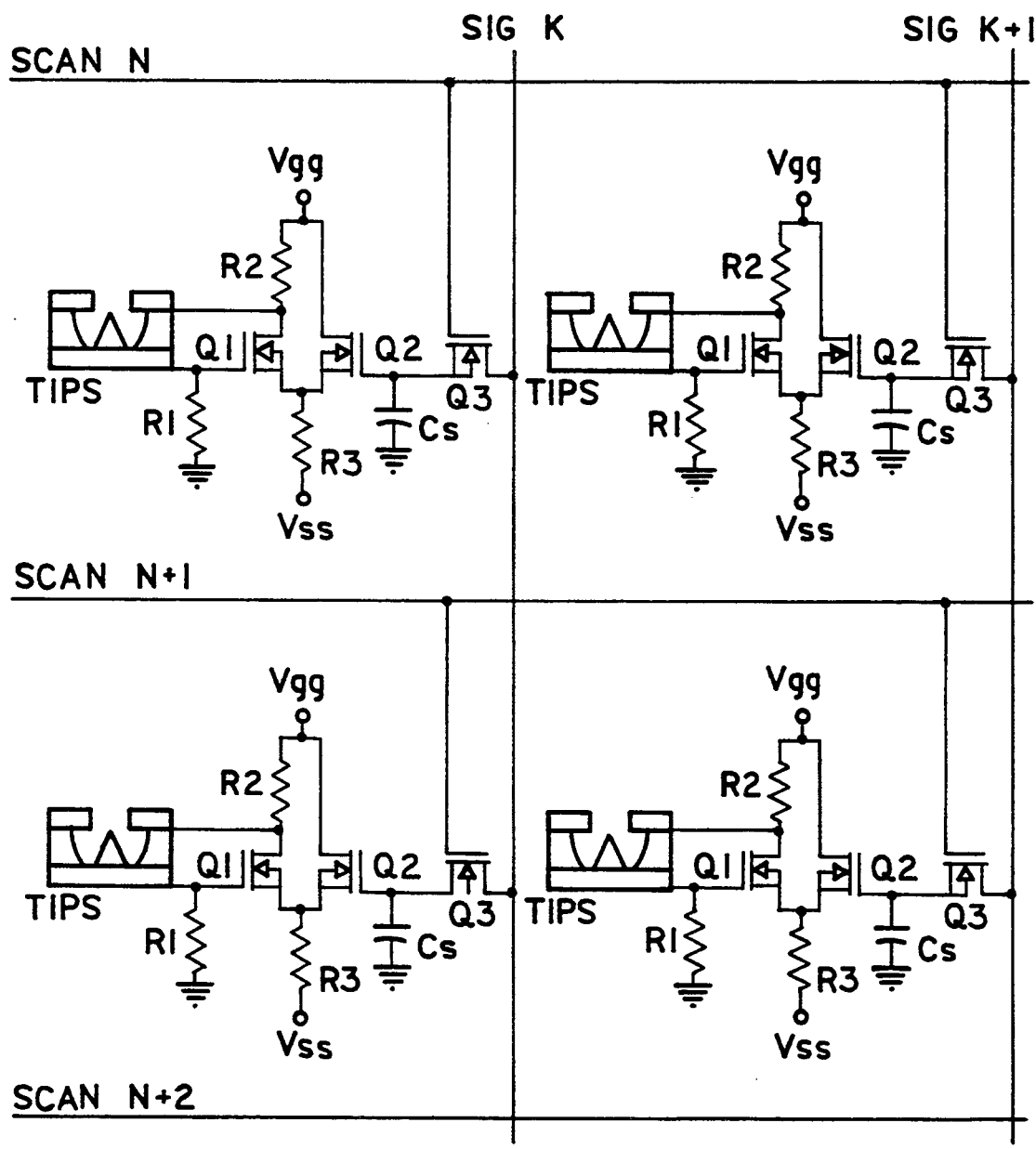
FIG._13C.

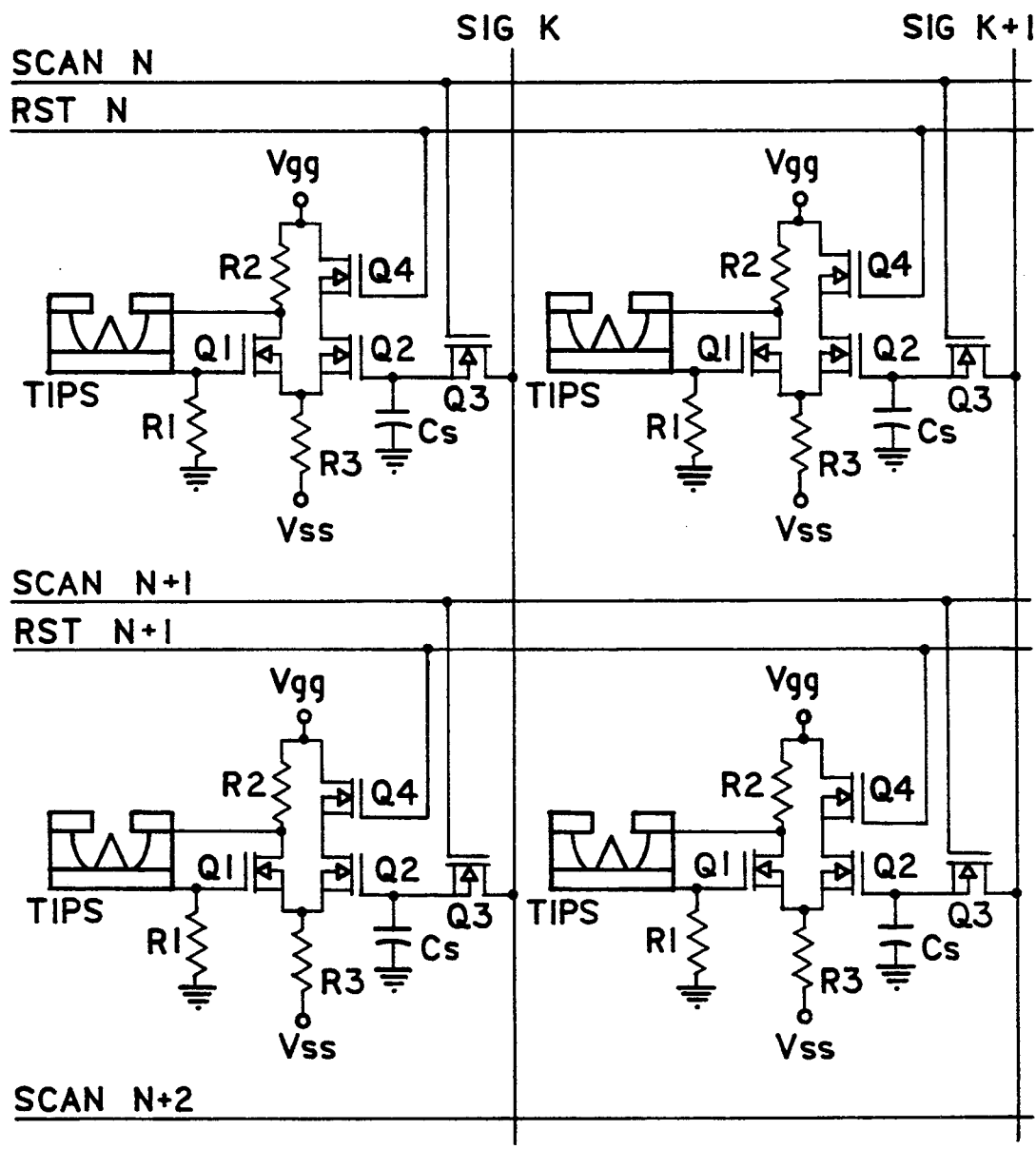
FIG._13D.

DISPLAY DEVICE

CROSS REFERENCED TO RELATED APPLICATIONS AND DOCUMENTS

The invention of this application is described in Disclosure Document No. 302531, received by the Patent and Trademark Office Mailroom on Feb. 21, 1992. This application is a continuation-in-part of the following U.S. and PCT applications:
1. U.S. application Ser. No. 657,867, filed Feb. 25, 1991 now U.S. Pat. No. 5,170,100;
2. U.S. application Ser. No. 730,110 filed Jul. 15, 1991 now U.S. Pat. No. 5,229,691;
3. U.S. application Ser. No. 812,730 filed Dec. 23, 1991; and
4. PCT Application Number PCT/U.S. Ser. No. 92/05883, filed Jul. 14, 1992.

The above applications are incorporated herein in their entirety by reference.

BACKGROUND OF THE INVENTION

Except for places where it is explicitly stated otherwise, in this application the term EFD will include those devices as introduced in U.S. application Ser. Nos. 657,867 and 730,110 and PCT Application Number PCT/U.S. Ser. No. 92/05883, and the term EFLCD will include the back light structures as introduced in U.S. application Ser. No. 812,730.

This invention relates in general to flat panel displays. This invention relates also to new cathode structures involving the FEAs (field emitter arrays) and the application of these new cathode structures in EFD (Electron Fluorescent Display), EFLCD (Electron Fluorescent Liquid Crystal Display) and MFD (Microtip Fluorescent Display) type direct matrix addressed type display.

EFD structures employ cathodes made of filaments whose operation is based on thermion emission. Thermion emission cathodes have become very popular since the days of vacuum tubes and this type of cathodes are still widely employed in technologies such as the cathode ray tube (CRT) and vacuum fluorescent device (VFD). There are many papers about this type of cathodes; their main strengths are the mature manufacturing technology and reliable operation. See P. S. Wagener, "The Oxide-Coated Cathode," 1951, Chapman & Hall Ltd. In the context of EFD applications, this filament cathode structure has the following weaknesses:

1. Due to the energy lost to the filament support by thermal conduction, the two ends and the center portion of each filament will not be at the same temperature. Since the rate of thermion emission is a sensitive function of the emitter body's temperature, the rate of emission at the two ends of the filament will be significantly lower than the center portion of the filament. This phenomenon is referred to as the cold terminal or cold end effect in U.S. application Ser. No. 730,110, and the above-referenced PCT application; it degrades the uniformity of the display and complicates the display control structure.

2. Due to large thermal inertia, the filament needs to be heated even when there is no need for it to emit electrons. For example, in a 1/100 duty factor EFD device, each portion of the filament needs to emit electrons only a few percent of the time, but the filament needs to maintain its high temperature constantly. This heating method causes a large amount of energy to be lost due to thermal radiation and conduction and degrades the luminous efficiency of the devices.

3. The operating temperature of the entire EFD device is raised due to the filament heating requirement. This elevated working temperature adversely affects the efficiency of the phosphor and the lifetime of various parts of the display system.

4. The filament needs to be spaced apart from other surfaces in order to maintain its temperature. This spacing increases the depth of the display device and complicates the structure and manufacturing process.

The cold cathode structure based on field emission principles, such as the microtip field emitter array (FEA) proposed by Spindt, is a solution to the above problems. See C. A. Spindt et al., "Physical Properties of Thin-Film Field-Emission Cathodes with Molybdenum Cones," pp. 5248, *J. Appl. Physics*, December 1976. These types of cathode structures have many nice features, such as high emission efficiency, high emission current, stable emission and simple control mechanism.

Companies such as Leti of France and SRI of the United States of America have demonstrated functional display devices based on direct addressed matrix of FEA cathodes of sizes up to a few inches in diagonal. See R. Meyer, "6-in. Diagonal Microtips Fluorescent Display For T.V. Application," pp. 374, *IDRC* 90 *Proceedings*, and C. A. Spindt et al., "Field-Emitter Arrays Applied to Vacuum Fluorescent Display," pp. 225, *IEEE Trans.* on Electron Devices, January 1989.

Coloray, a U.S. company, has also disclosed plans for making display devices based on this type of technology. See "Field Emission Display—Technology Review," Technical Note # 01, Coloray Display Corporation, 1990. As shown in FIG. 1A, these devices have a shared basic structure comprising a vacuum chamber between two face plates placed parallel to each other with a spacing of about 1 millimeter or less, wherein a transparent anode is placed on one of the face plates, a layer of phosphor dots placed on top of the anode, a matrix of field-emitting cathode dots between a set of column electrodes CE', and a set of row electrodes RE.

When a voltage is applied between a column electrode and a row electrode, the cathode dot located in the overlapping area between the two electrodes will emit electrons, so that the cathode dots are directly addressable through the two sets: CE', RE. Each cathode dot corresponds to a pixel of the display. Images are displayed by projecting and accelerating the electrons generated by the cathode dots toward the corresponding phosphor dots coated on top of the anode. The brightness of each phosphor dot is modulated by controlling the rate of electron emission by the corresponding cathode dots. There can be many other variations to the basic device structures. Some may involve focusing means between the cathode and the anode. However, no matter what variation of this structure, the image is formed by directly controlling the electron emission of each cathode dot. In other words, the electrons emitted by a matrix of cathode dots are directed towards corresponding parts of the display in directions normal to the face plates in response to the voltage applied between CE' and RE, essentially without deflection in directions parallel to the face plates; this manner of addressing is referred to herein as direct matrix addressing. We will refer to all these variations involving this operation principle as direct matrixed FEA displays.

Since the above-described FEA displays do not deflect the paths of the electrons for addressing, the microtip structure and its variations employed in these FEA displays require very high precision etching, patterning, and photolithography processes, production of functional FEA cathodes is expected to be very difficult. See Japan Patent Disclosure Number: JP 3-276542, December 1991. Due to such problems, the size of direct matrixed FEA displays is currently not expected to exceed a few inches in diagonal dimensions. For display devices based on direct matrixed FEA architecture, this problem of FEA cathode production quality and yield are likely to become the most important issues to be overcome.

Another area of the field emitter cathode technology that needs further improvements is the uniformity control of the electron emission rate. In the following references: R. Meyer, "6-in. Diagonal Microtips Fluorescent Display for T.V. Application," pp. 374, *IDRC* 90 *Proceedings*; T. Leroux et al., "Microtips Displays Addressing," pp. 437, *SID* 91 *Digest*; M. Borel et al., "Electron Source with Micropoint Emissive Cathodes and Display Means by Cathodoluminescence Excited by Field Emission Using Said Source," U.S. Pat. No. 4,940,916, June 1990; and as illustrated in FIG. 2A, it is proposed that a resistive layer is to be inserted between the electron emitter and the base electrode of the cathode. While the emission uniformity is improved, excessive electron emission is suppressed due to the loading of the inserted resistive layer as shown in FIG. 2B, so that this approach has some drawbacks as listed below:

1. The voltage drop over the inserted resistive layer pushes the control voltage Vgb, the gate to base potential difference, to be 80 V or higher. See R. Meyer, "6-in. Diagonal Microtips Fluorescent Display For T.V. Application," pp. 374, *IDRC* 90 *Proceedings*; T. Leroux et al., "Microtips Displays Addressing," pp. 437, *SID* 91 *Digest*; A. C. Lowe, "Microtip Field-Emission Display Performance Considerations," pp. 523, *SID* 92 *Digest*. This is undesirable because expensive high voltage drivers will be required to interface with the device.

2. The resistive layer only provides a moderate compensation to balance the current emission rate of the cathode. Higher level of compensation will require higher resistivity of the inserted layer which implies that even higher Vgb are required. This means either that the uniformity control of current emission will be too loose or the gate control voltage will be too high. Neither of these are desirable.

In reference Japan Patent Disclosure Number: JP 3-295138, December 1991 and FIG. 1B, a circuit made of two transistors and a capacitor is proposed to enhance the brightness of a direct matrixed FEA display. This circuit failed to address the two problems mentioned above. In addition, due to the fact that the control transistor is connected to the base of the emitter instead of the gate, the low current of each pixel and the generally sharp transition of FET transistor's I-V curve near its threshold voltage, the method proposed in the above-referenced Japanese disclosure can only be operated in switch mode, i.e., the circuit will either turn on or turn off the emission of the cathode. This drastically limits the capability of the display from achieving gray scales through analog modulation of the emission current and restricts the usefulness of this method in non-alphanumerical display applications.

None of the above-described systems is entirely satisfactory. It is thus desirable to provide an improved image display system in which the above discussed difficulties are avoided or reduced.

SUMMARY OF THE INVENTION

One aspect of the invention is based the recognition that the above-described difficulties of direct matrixed FEA displays can be alleviated by employing EFD addressing techniques in FEA type displays. Similarly, the disadvantages of conventional EFD displays can be avoided by employing cold cathode structures of FEA type displays.

In EFD technology, the addressing of pixels is accomplished by layers of control electrodes and not by direct matrix addressing. In EFD, electric fields parallel to the face plates are applied to the electrons generated to spread out the electrons in directions parallel to the face plates for addressing. The cathode in EFD is mainly responsible for providing a cloud of free electrons which will be further spread out by various control electrodes or uniformity enhancement means. This feature allows the cathode to be made of a group of small FEA type cold cathodes of, for example, 2 millimeter square or smaller. These small FEA cold cathodes can be readily manufactured by current semiconductor technology and handled by surface mount technologies. Since the electrons are spread out in addressing, EFD operation does not require a true planar electron source, and an array of sparsely disposed small FEA cathodes, occupying a few percent or even less than one percent of the total display area, will satisfy the requirement of various EFD devices. This structure should significantly reduce the cost for cathodes as compared to what is required by direct matrixed FEA displays.

Based on the above observations, one aspect of this invention is an improved EFD structure with field emission cold cathode structure. This new EFD structure, referred to as EFD/CC (Electron Fluorescent Display with Cold Cathode), is a cathodoluminescent display device described below.

One aspect of the invention is directed towards a display device for displaying images when viewed in a viewing direction. The device comprises a first and a second face plate, a set of side walls or a set of spacer means which, together with a face plates, define a vacuum chamber therein. The device further comprises an anode placed on or near the first face plate in the chamber, cathodoluminescent means in the chamber on or near the anode, for generating light in response to bombardment of electrons. The device also includes a multitude of electron emitting cathode elements, each containing at least one control gate, at least one base electrode and at least one field emitter, on or near the second face plate. Included also is means for applying voltage to the cathode elements to cause the elements to generate electrons forming an electron cloud, and at least two layers of control electrodes between the anode and the cathode. The control electrodes accelerate the free electrons generated by the cathode towards the anode and the cathodoluminescent means to cause the cathodoluminescent means to emit light for displaying images. The device further comprises means for applying electrical potentials to the control electrodes such that electrons from the electron cloud are directed to selected locations of the cathodoluminescent means in selected quantities for displaying images at said desired locations of the desired brightness. The device is referred to immediately below as an EFD/CC device.

In the preferred embodiment, the cathode of the EFD/CC device may further comprises a multitude of small electron emitting cathode elements CE' each containing one or more field emitter arrays called emitter blocks, EB, and an optional embedded control circuit block CB to control the current emission of the cathode. Furthermore, in the preferred embodiment, uniformity enhancement means may be incorporated in the small cathode elements or be deposited inside the vacuum chamber to create electric fields to spread out electrons emitted by the field emitters. The device may further comprise or contain other features as described in the above-referenced related applications.

By incorporating local control circuits containing amplifiers into the field emitter array structure, feed back control technologies can be applied so that the current emission rate can be tightly controlled. Similarly, other functions such as multiplexing, buffering, decoding and memory device can also be achieved through various circuit configurations.

Another aspect of this invention is a new cathode structure for direct matrixed FEA displays incorporating where local circuit components are used to sense and to control the current emission process of the cathode dots.

Yet another aspect of the invention is directed towards a display device comprising a first and a second face plate, an anode placed on or near the first face plate and cathodoluminescent means on or near the anode, to generate light in response to bombardment of accelerated electrons. The device also includes one or more cathode structures on or near the second face plates, each structure comprising a matrix of electron emitting cathode dots. Each cathode dot contains at least a control gate, at least a base electrode, at least a field emitter and an optional buffering resistive layer placed between field emitters and the base electrode. The device also includes means for causing the electrons to be generated by the cathode dots to travel toward the cathodoluminescent means, causing the cathodoluminescent means to display images, and the control circuit for sensing a current cause by electron emission of at least one cathode dot, comparing the sense current to an input signal to derive a control signal for controlling the electron emission process of the cathode dot.

One embodiment for the control circuit of the field emitter cathode is shown in FIG. 5B. The control signal for the emitter is applied to the gate electrode G of the emitters. A current sensor IS, connected directly or indirectly to the base B of the emitters, will sense the current emitted by the emitters and produce a feed back signal to the differential amplifier AMP. The input signal Sig may be preprocessed by the signal processing unit SP to produce signal S to feed to AMP. Possible functionality for SP may include analog or digital memory, switches, multiplexers or buffer amplifiers. AMP compares the feedback signal produced by the current sensor to signal S and produces an output Vg to control the gate of the emitters.

In summary, the new structure has the following advantages over the previous EFD structures or direct matrixed FEA structures:

1. No filament cold end effect, more uniform display devices;

2. No heating power lost, improved efficiency and lower operating temperature;

3. Tight control of cathode emission to improve uniformity;

4. Low voltage cathode emission control through embedded amplifier circuit; and

5. Flexible functionality through local control circuit.

Still another aspect of the invention is directed towards an image display device comprising a substantially flat front end unit containing a matrix of independently controllable light shutters, and front and control means for addressing and controlling the light shutters in the front end unit. The device also includes a substantially flat back end unit generating light pulses of one or more colors, directed towards the front end unit for displaying images when viewed from a viewing direction form the front end unit. The back end unit comprises an anode, cathodoluminescent means on or near the anode, for generating light in response to bombardment of electrons. Included in the device are a multitude of electrons emitting cathode elements, each containing at least one control gate, at least one base electrode, at least one field emitter, and means for applying voltage to the cathode elements to cause the elements to generate electrons forming an electron cloud. The device further includes means for causing electrons in the electron cloud to travel towards the anode and sent cathodoluminescent means to cause the cathodoluminescent means to generate the light signals. The causing means includes at least one layer of control electrodes between the anode and the cathode to control and accelerate the electrons generated by the cathode and the anode and the cathodoluminescent means to admit the light signals.

Another aspect of the invention is directed toward an image display device for displaying images when viewed in a viewing direction. The image display device includes a substantially flat front end unit continuing the matrix of independently controllable light shutters, each shutter having an area and front and control means for addressing and controlling the light shutters to control passage of light through a portion of the area of each light shutter in the front end unit, said portion defining a light shutter area. The device also has a substantially flat back end unit containing a multitude of sub-sections, each sub-section corresponding to a group of light shutters for image display. The device further includes back end control means for controlling each sub-section independently from the remaining sub-sections to cause each sub-section to generate light pulses of one or more colors from at least one portion of its area, said portion defining a light emitting area, directed toward the corresponding group of light shutters in the front end unit. The front and back control means cause the light pulse from at least one sub-section to be synchronized with the passage of light through the corresponding group of light shutters in the front end unit.

Still another aspect of the invention is directed towards a method for addressing an image display device, where the device includes a substantially front end unit containing rows and columns of independently controllable light shutters forming a two-dimensional array. The shutters change the transmittance characteristic in response to a signal. The shutters require a predetermined response time period after the application of a signal thereto before light transmitted therethrough approaches a predetermined value. The device also has a substantially flat back end unit for generating light pulses of one or more colors, directed towards the front end unit for displaying images when viewed from a viewing direction from the front end unit. The front end unit comprises a multitude of sub-sections, such that light from each sub-section is directed to a predetermined number of rows or columns of the light shutters for image display. The light shutters in the determined number of rows or columns define corresponding light shutters of the sub-section. The method of this aspect of the invention comprises applying scanning signals to the rows or columns of light shutters in the array to change the light transmittance through such shutters in the rows and columns. A scanning cycle is defined as the time period required for scanning signals to be applied once to all rows or columns of light shutters. The method also includes the step of causing the sub-sections of the back end unit to emit light periodically directed towards the corresponding light shutters so that the light is directed from each sub-section to corresponding light shutters at a time delay after scanning signals have been applied to said corresponding light shutters, said time delay being substantially equal to or larger than the response time periods of the shutters.

BRIEF DESCRIPTION OF THE DRAWINGS

FIG. 1A is a perspective view of a field emitter array (FEA) type display device illustrating a conventional design.

FIG. 1B is a perspective view illustrating another type of conventional field emitter array type display.

FIG. 2A is a cross section of view of a conventional cold cathode type design.

FIG. 2B is a graphical illustration of the current emitted by a cold cathode in the conventional field emitter array as a function of the gate voltage.

FIG. 3 is a perspective view of a EFD design illustrating this invention.

FIG. 4A is a cross-section view of a portion of the device in FIG. 3.

FIG. 4B is an exploded view of a portion of the device in FIG. 4A and of a controlled circuit.

FIG. 5A is a perspective view of a cathode structure to illustrate the invention.

FIG. 5B is a partially cross-sectional and partially schematic view of a conceptual design of a cold cathode with a control scheme for controlling the electron emission process of the cathode structure to illustrate the invention.

FIGS. 5C–5F are schematic circuit diagrams to illustrate different embodiments of the control circuit for FIG. 5B.

FIG. 6A is a cross sectional view of a distributed tip configuration of a cold cathode to illustrate the invention.

FIG. 6B is a top view of the cold cathode of the design shown in FIG. 6A.

FIG. 6C is a cross-sectional view of a cold cathode design to illustrate a preferred embodiment.

FIG. 7 is a perspective view of an EFLCD device to illustrate the invention.

FIG. 8 is a back view of the device in FIG. 7.

FIG. 9 is a cross-sectional view of a portion of the device in FIG. 8 together with a control circuit.

FIG. 10 is a timing diagram illustrating the operation of the device in FIGS. 7–9.

FIG. 11 is a cross-sectional view of a portion of the device in FIG. 7 to illustrate yet another embodiment.

FIG. 13A is a perspective view of a portion of a direct matrixed field emission device to illustrate another aspect of invention.

FIGS. 13B–13D are schematic circuit diagrams illustrating three different embodiments for the control circuit of FIG. 13A.

DETAILED DESCRIPTION OF THE PREFERRED EMBODIMENT

Figure 12:
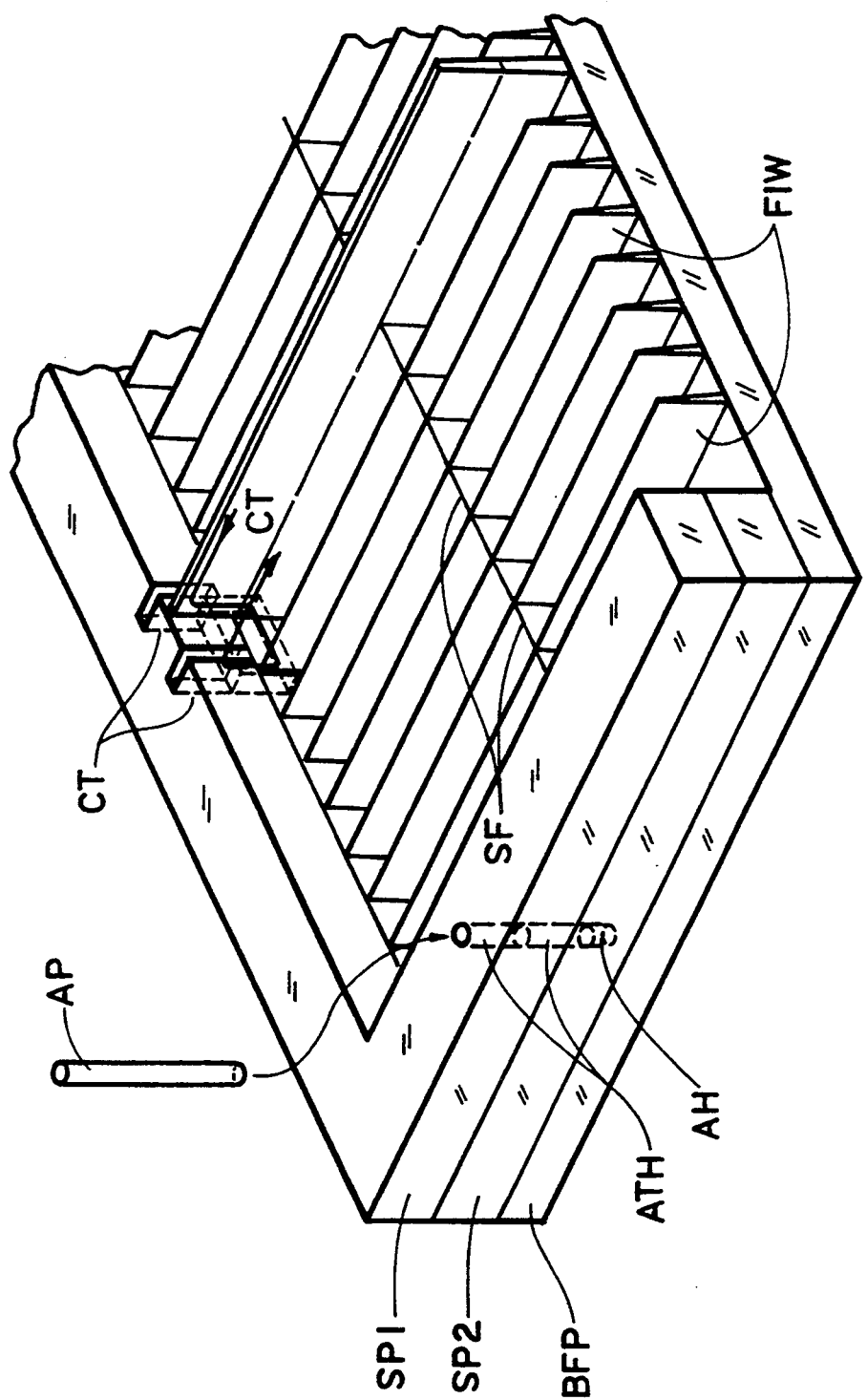
FIG. 12 is a perspective view of a portion of the device in FIG. 11.

First embodiment: EFD with Field Emitter Cathode

Referring to FIGS. 3 to 5, an embodiment of the EFD device incorporating the field emitter cathode is illustrated. Like reference will designate like or corresponding parts throughout the discussion of this embodiment.

FIG. 3 shows the intended viewing position of device described in this embodiment. FIG. 4A is a cross-section view of this device. FIG. 4B is a closed-up view of a portion of FIG. 4A. FIG. 5A shows one embodiment of a cathode element in this device. FIG. 5B is a conceptual schema of the cathode element configuration. FIGS. 5C–5F are schematic circuit diagrams of some different embodiments of a control circuit for the cathode element.

The demonstrated EFD device includes a vacuum chamber defined by a front face plate FFP, a back face plate BFP, and a set of side walls. On the front face plate FFP is an anode A made of transparent conductive coatings such as ITO or $SnO_2$. A layer of cathodoluminescent phosphor dots PD are further coated on top of the anode A. This layer of phosphor dots PD will generate light of one or more colors in response to the bombardment of accelerated electrons. A layer of net-shaped black matrix, made of black glass frit or other material, may be coated between the phosphor layer and the anode to enhance the contrast.

The back of the phosphor layer may be further coated with a layer of aluminum to protect the phosphor and to increase the brightness. These layers of aluminum coating and the black matrix can be applied with conventional CRT manufacturing technology.

Inside the vacuum chamber, on top of the FFP, three layers of spacer plates SP1, SP2, SP3 are stacked together. On top of SP3, a layer of spacer bars SB completes the connection between FFP and the BFP, where the bars SB are aligned with the bars forming net-shaped structures of the plates SP1–SP3. Through the SP1–SP3 and SB, the FFP and BFP are rigidly connected together and form a solid housing structure. Adhesive means may further be applied to the contact surfaces between FFP —SP3—SP2—SP1—SB/-SW—BFP to strengthen the housing. Three layers of control electrodes G1, G2 and G3 are disposed inside the chamber and sandwiched between the spacer plates and spacer bar layer. Among these control electrode layers, G1 is between SB and SP1, G2 is between SP1 and SP2 and G3 is between SP2 and SP3. In normal viewing position, the orientation of electrodes in G1 and G3 is horizontal and they are operated in synchronization to perform line scanning operation. Electrodes in G2 is oriented vertically to perform data modulation. The overlapping area between every distinct pair of G2 electrode and G3 electrode defines a pixel, which is the smallest controllable unit of the device. A control circuit CC applies appropriate electrical potentials to the electrodes G1–G3, as well as the anode and cathodes for controlling addressing and brightness of the display through conductive lines (not shown) on the face plates and side walls.

In practical implementation, the thickness of FFP and BFP are between 1 to 3 mm, the distance between anode-G3-G2-G1-cathode is between 0.5 to 2.5 mm, and therefore, the total thickness of the device is between about 5 to 15 mm.

The cathode comprises an array of small cathode elements CE disposed on and attached to the back face plate BFP. Each of the cathode elements CE may contain one or more emitter block EB. Each of EB contains an array of field emitters, as illustrated in FIG. 5A. Each emitter has an emitter cone EC, a gate electrode G, an optional resistive buffering layer R and a base electrode B. Lateral field emitter structures with tips oriented around in different directions, such as the ones shown in FIG. 6B, may also be employed. FIG. 6B is a top view of a portion of block EB of FIG. 5A. FIG. 6A is a cross-sectional view taken along the line 6A—6A in FIG. 6B. Properly arranged lateral field emitters will improve the uniformity by spreading the electrons in an omnidirectional manner.

An optional embedded control circuit block CB may also be included in the cathode element CE to control the electron emission process of the emitter block EB. A conceptual schema of the cathode element CE with the optional CB is shown in FIG. 5B. The control circuit block CB may contain functions such as current sensors IS, differential amplifier AMP, feedback loops and signal processing functions SP such as analog or digital type memory devices, switches and buffer amplifiers (not shown).

A few examples of possible functionality combination implemented in FET technology is illustrated in FIGS. 5C–5F. FET circuit is a fairly natural extension to the field emitter structure. By doping, etching, CVD and other thin-film-transistor or silicon processing steps, metal gate or silicon gate FET circuits can be readily included into the structure of the field emitter array cathode. In the examples given in FIG. 5D, Ckt-1 is a simple sense-feedback control circuit. The resistor R1 is the current sensor to produce the feedback signal. The ratio between R2:R3 determines the gain a of the amplifier, that means the emission current error is amplified by a times to correct the gate control voltage Vg. Ckt-2 in FIG. 5E contains a differential amplifier made up of Q1 and Q2, while R1 functions as the current sensor. In addition to significantly higher gain of the differential amplifier, the configuration of Ckt-2 also allows each component to be optimized more independently. Ckt-3 in FIG. 5C further demonstrates a sample-hold analog memory device comprised of Q3 and Cs. Ckt-4 of FIG. 5F further illustrates the implementation of a switch made of Q4 which, when turned off, will force Vg to go low and cut off the electron emission of the emitter. In all these four circuits, if the gain a of the amplifier is chosen to be sufficiently large, the final error of the emission current can be minimized and the emission current of the cathode can be related to the input Sig by: $Itip \sim (Sig+Vo)/R1$, where Vo accounts for the threshold voltage of FET, biasing and other requirements of the circuits. From this equation, it is obvious that the value of R1 is an important factor determining the current emitted by the tip. This value needs to be properly controlled in order to obtain good electron emission uniformity. Resistor value control technology such as laser trimming can be used for this purpose.

The exact size and density of CEs depends on the following factors: 1) the free electron emission rate of those cone cathode tips; 2) the efficiency of the phosphor; 3) the anode voltage; and 4) uniformity considerations. For example, in a 500 nit display, assuming the transmittance of FFP is 40%, anode voltage is 2.5 KV, phosphor efficiency is 4 Lm/W for white light, then the calculated anode current requirement is under 50 $\mu A$ per cm2. Since cone shape field emitter can generate over 1 $\mu A$ per tip, (in reference to the R. Meyer article above), and because the pitch between emitter cones can be as close as 5 microns, even if a majority of the area in each cathode element CE is used for control, bounding or other purpose, a 1 mm by 1 mm CE may contain over one thousand emitter cones. Due to this reason, a sparsely spaced array of CE will be able to provide enough free electrons for the requirement of anode power. The density and placement of CEs inside the display will therefore be determined largely by brightness uniformity requirements. In practical implementations of the structure, the dimensions of CE can be smaller than about 2 millimeters and the spacing between CEs can be in a range of between around 5 to 25 millimeters, depending on the spacing between cathode to G1 electrodes, the effectiveness of the uniformity enhancement apparatus and the uniformity requirements. The shape of CE depends on the particular needs of each application. Some reasonable examples are square, rectangle or stripe.

In order to uniformly distribute the electrons generated by the cathode elements CEs, uniformity enhancement electrodes UEE may be placed on the back face plate BFP or the surface of spacer bars SB. When these UEE electrodes are properly energized with positive voltages, as measured relative to the base electrode B of CE, an electric field can be created which will spread out the free electrons emitted by CE and therefore enhance the uniformity of the displayed image.

Uniformity enhancement can also be achieved by configuration such as the example shown in FIG. 6C, where an additional electrode UE is placed on top of the gate electrode. When properly energized, this electrode will create an electric field to diffuse the electrons generated by the cone emitter tips as illustrated by the arrows in FIG. 6C and therefore avoid the tendency of electron concentration along the axis of the cone emitters.

In operation, the electrodes in G1 and G3 are scanned in synchronization to perform a line-by-line scanning operation. Normally the electrodes in G3 is scanned in sequence and the corresponding G1 electrodes will also be scanned. The cathode elements CEs overlapping or bordering the scanned electrodes in G1 and G3, when viewed in the normal viewing direction, will be turned on to emit free electrons by applying proper signals to the gate electrode G or the control block CB of the cathode element CE. Other cathode elements CE not overlapping or bordering the scanned electrodes in G1 and G3 will be turned off to save power. The electrons emitted by the cathode are accelerated and controlled by the three layers of control electrodes G1, G2 and G3. The electric field applied by the control electrodes and the anode and cathodes will cause the electrons to spread out laterally in directions parallel to the face plates while travelling to the anode. The electrons that are allowed to pass through G3 are accelerated by the voltage applied to the anode and will bombard proper phosphor dots to emit lights.

Embodiment 2

A EFLCD backlight with field emitter cathode Referring to FIGS. 7 to 10, an embodiment of the EFLCD device incorporating the field emitter cathode is illustrated. Like reference will designate like or corresponding parts throughout the discussion of this embodiment.

FIG. 7 shows the normal viewing position of the device described in this embodiment. FIG. 8 is a see-through view of the backlighting unit of FIG. 7. FIG. 9 is a cross-section view of a portion of FIG. 8. The schema and the configuration of the cathode element are similar to the previous embodiment in reference to FIGS. 5A–5F, 6A–6C.

The demonstrated EFLCD device includes a LCD light shutter front end unit, a diffuser layer and a EFD pulse backlighting back end unit. By synchronizing the operation of these two units, images of different color and gray shade combinations can be displayed when viewed in the normal viewing position as shown in FIG. 7. While this embodiment is illustrated by the use of a LCD type device for the front end unit, it will be understood that other light shutters may be used instead and are within the scope of the invention.

The LCD front end can be of passively addressed variety or actively addressed variety, operating in bi-stable mode or half-tone modulation mode by control circuit CC'. In this application, each pixel in the LCD can produce color mixing through modulation of periodical pulses of three primary colors.

Therefore, there is no need for color filtering or multiple sub-pixels as employed in the conventional color LCDs.

The backlighting unit is a vacuum device defined by a front face plate FFP, a back face plate BFP and a set of side walls SW. The back face plate BFP further comprises an anode A made of reflective conductor such as aluminum. A layer of cathodoluminescent phosphor stripes PS are further coated on top of the anode A. This layer of phosphor stripes will generate light of one or more colors in response to the bombardment of accelerated electrons. The cathode of this backlighting unit comprises an array of cathode elements CEs made of field emitter arrays. These cathode elements CEs can be bonded to the FFP through adhesive means, such as transparent glass frit or other suitable high temperature bounding material. Transparent circuit traces and electrodes may be printed or coated on the FFP (not shown). Control signals for the CEs are routed through the circuit traces on the surface of FFP, and other control signals destined for the anode and grid electrodes are similarly routed from a control circuit CC''.

Two layers of control electrodes G1 and G2 are placed inside the vacuum chamber to spread out the electrons and to control the passage of the electrons from the cathode to the anode. Among them G1 is placed closer to the cathode and is mostly responsible for spreading and accelerating the electrons generated by the array of cathode elements CEs. The control electrodes layer G2 is placed between G1 and the anode. G2 is responsible for the addressing and focusing of electrons to proper phosphor stripes. G1 and G2 are preferably placed parallel to and aligned with the phosphor stripes PS on the anode A. In a practical implementation of this embodiment, the spacing between cathode-G1-G2-anode is around 0.5 mm to 2.5 mm, and the thickness of FFP and BFP is around 1 mm to 2 mm, added together, the total thickness or depth of the backlighting unit can be made around 4 mm to 12 mm.

The backlighting unit may further comprise a multitude of spacer bars SBs, placed parallel to the orientation of the phosphor stripes PS, defining sub-chambers between each pair of spacer bars SB and between the spacer bars and the side walls. The cross-section of these spacer bars SB are wedge shaped where the pointed side will be placed abutting the FFP and the other end of the wedge is placed abutting the BFP, to increase the mechanical strength of the device. These spacer bars SB may be attached to the FFP and BFP through adhesive means such as transparent glass frit or other suitable high-temperature, transparent bonding materials. An array of properly-spaced SBs will allow thin glass plates of around 1 millimeter to be used as FFP and BFP.

In order to produce smooth backlighting for the LCD front end, uniformity enhancement electrodes UEE made of transparent or reflective conductors may be placed on the surface of front face plate FFP and spacer bars SBs. When positively energized, these UEE electrodes can create electric fields to spread out the electrons generated by the cathode elements and therefore smooth out the lights produces by the backlighting unit.

The side wall SW of this embodiment is of a triple-layered structure. Control electrodes G1 and G2 are sandwiched between the triple-layered side wall structure. An outgassing tube OGT (not shown) is placed along one side of the wall, which is sealed after the device is properly evacuated.

It is very important to minimize the visual impart of the cathode structure for this application where the light generated is to be viewed through the cathode structure. Fortunately, the electron emission rate of cone tip field emitter cathode is very high and this allows the cathode elements CE to be made very small and occupy a very small percentage of the total array of the back light. For example, consider a backlighting unit capable of generating 750 nit of white light, assuming the anode voltage is 2 KV and the phosphor luminous efficiency is 6 Lm/W for white light, then the anode current requirement is calculated to be under 25 $\mu$A per cm2. Use parameters as reported in the above referenced article by R. Meyer, i.e., the emitter tip size around 1.4 microns each, array pitch around 5 microns and each tip can generate over 1 $\mu$A, a cathode element with a 0.2 mm by 0.2 mm emitter block EB may contain over 1000 emitter tips. These cathode elements CEs, placed in a two-dimensional array format with pitch about 5 mm to 25 mm, will occupy a very small percentage of the total FFP area and will supply enough free electrons for the required brightness. G1, G2 electrodes can be made of parallel fine metal wires, metal wire cloth or net shaped metal foil formed through perforation or etching.

The shadow of the cathode element CE can be reduced through the use of diffusers. In addition, as shown in FIG. 11, the front face plate FFP may further have its surface processed in such a way that optical means are formed where the CEs are placed or where the spacer bars SB made contact with FFP, in order to optically reduce the visual impact of CEs and SBs.

In operation, phosphors stripes are grouped into sub-sections and phosphors stripes of different color in these sub-sections are turned on and off sequentially to display each color, such that, backlight of color red (R) of intensity I1 is displayed by sub-section 1 then sub-section 2 and so on, and then backlight light of color green (G) intensity I2 is displayed by sub-section 1 then sub-section 2 and so on. In this embodiment, there are three G1 electrodes and nine G2 electrodes in each sub-chamber as shown in FIG. 9. Every three consecutive G2 electrodes, corresponding to a set of red, green and blue phosphors stripes, form a sub-section. A corresponding G1 electrode is placed overlapping each sub-section of G2 when viewed in the viewing direction shown in FIG. 7. G2 electrodes controlling phosphor stripes emitting lights of same color are connected together. G1 electrodes are connected into three groups according to their location in each sub-chamber. When backlight of color blue (B) in a particular sub-section S is to be turned on, the cathode elements CEs in the sub-chamber will be turned on by applying a positive voltage to the gate electrode G or to the control block CB of these CEs in the sub-chamber, the set of G1 electrodes controlling sub-section S will be positively energized, the set of G2 electrodes corresponding to the phosphor stripes that can emit lights of color blue (B) will also be positively energized. All other G1 electrodes, G2 electrodes and CEs in other sub-chambers are negatively energized or otherwise turned off.

A simplified timing sequence and waveform for various information are illustrated in FIG. 10. Such sequence and waveform are generated by control circuits CC' and CC'' of FIGS. 7, 9. In this chart, a TFT-LCD panel is assumed to be used as the front end unit, and the backlighting unit is assumed to have four sub-sections. Those lines labeled as "TFT-Gate" refer to the gate control waveform of the TFTs in the LCD panel. Those lines labeled as "L.C." refer to the optical response of the liquid crystal cell according to the data voltage stored in each pixel electrode in the TFT-LCD. Those lines labeled as "B.L." refer to the timing of backlighting pulses of various colors.

The LCD switching process and the pulse generation timing of the back light are synchronized. The timing relationship illustrates that while the LCD cells of some sub-sections are settling according to the data stored in the pixel, backlight pulses from other sub-sections are flashed to other sections of LCD cells that has already settled.

At time t0 a scanning pulse 5 is applied to the TFT Gate—sub-section 1. Subsequent to time t0 and prior to time t1, similar scanning pulses 5', 5'', 5''' are applied to TFT Gates of sub-sections 2, 3, and 4. At time t1 another scanning pulse is applied to the TFT Gate of sub-section 1. The scanning pulse applied to the TFT Gate of a sub-section would cause the light shutters (in this case LCD) to change its light transmittance characteristic. The time period between t0 and t1 defines one scanning cycle during which scanning signals are applied once to all rows or columns of light shutters in the corresponding sub-sections. The LCD cells have a slow response time. As shown in FIG. 10, the response time of the LCD cell in sub-section 1 is such that it is not fully turned on until towards the middle of the scanning cycle between t0 and t1. In order to maximize the brightness of the display, the back light pulse 15 from sub-section 1 is applied almost at the end of the first scanning cycle, which is a green (G) light pulse. As shown in FIG. 10, this green light pulse is generated and directed toward the LCD cells in sub-section 1, when the LCD cells are at the maximum light transmittance level. The timing relationship between the scanning pulse applies to the TFT Gate of sub-section 1 at time t0 and the back light green pulse applied slightly before the time t1 is illustrated by the arrow 10 between two pulses in FIG. 1.

By dividing the group of grid electrodes of the back end unit in sub-sections so that the four sub-sections may be controlled separately, it is possible to reduce the time delay otherwise required as illustrated below.

As explained above, the green light pulse 15 correlates with the scanning pulse 5 in a predetermined timing relationship so as to maximize the brightness of the display. Similarly, after the scanning pulse 5''' is applied to the TFT Gate of sub-section 4, the LCD cells of sub-section 4 have not settled or approached its maximum transmittance until about halfway in the scanning cycle between t1 and t2. This means that in order to maximize the brightness, the back light pulse directed to the LCD cells in sub-section 4 should not be generated until after the halfway point between t1 and t2. If the back light pulse for all four sections are to be generated simultaneously, the back light pulse destined to the LCD cells of sub-section 1 should not be generated until after the halfway point between the next cycle t1 to t2. If this is the case, the next scanning pulse destined to the TFT Gate of sub-section 1 should be delayed so that the LCD cells in sub-section 1 would remain at its maximum transmittance when such back light pulses are generated for all four sub-sections. In other words, the addressing time required is substantially equal to the sum of the scanning cycle and the response time of the LCD cells.

By dividing the back end unit into sub-sections, the addressing time is reduced to the larger one of the scanning cycle and the response time of the LCD cells. While it is sufficient to delay the back lighting pulses for a time period substantially equal to the response time of the LCD cells or other light shutters, the back light pulses may be delayed for a time period longer than the response time of the light shutters which is also within the scope of the invention. Obviously, when back light pulses are delayed for longer time periods, it will result in slower addressing of the device.

By overlapping these LCD settling processes with the backlighting pulses as described above, a LCD front end unit with response time faster than about 5 mS can be used to produce high quality full color (red/-green/blue) images with a refresh rate of 60 Hz or faster. This overlapping of operation is achieved through the section by section control of G1, G2 electrodes and cathode elements CEs.

Embodiment 3

This embodiment is a EFLCD backlight device with field emitter cathode and spacer. Referring to FIG. 7, FIG. 11 and FIG. 12, another implementation of an EFLCD backlighting unit is illustrated. Like reference will designate like or corresponding parts throughout the discussion of this embodiment.

FIG. 7 is a view from the normal viewing position for a EFLCD display incorporating a backlighting unit described in this embodiment. FIG. 11 is a cross section view of a portion of the backlight unit. FIG. 12 is a cutaway view of a corner of the backlighting unit of FIG. 11.

The illustrated backlighting unit is a vacuum device defined by a front face plate FFP, a back face plate BFP and two spacer plates SP1 and SP2. The back face plate BFP comprises an anode A made of reflective conductor such as aluminum. A layer of cathodoluminescent phosphor stripes PS is further coated on top of the anode A. This layer of phosphor stripes will generate light of one or more colors in response to the bombardment of accelerated electrons. The front face plate FFP comprises an array of cathode elements CEs made of field emitter arrays. These cathode elements CEs can be bonded to the FFP through adhesive means, such as glass frit or other suitable high-temperature bounding material. Transparent circuit traces and electrodes (not shown) are printed or coated on the FFP. Control signals are sent to the CEs via the circuit traces on the FFP from a control circuit (not shown). The electrodes printed on the FFB will be energized with various positive voltages relative to the cathode. These electrodes will generate electric fields to spread out the electrons generated by the cathode to enhance the uniformity of the cathode currents received by the anode.

One layer of control electrodes G2 is placed inside the vacuum chamber to control the passage of the electrons from the cathode to the anode. These G2 electrodes are of substantially the same size and shape as the phosphor stripes PS. When viewed from the normal viewing direction as shown in FIG. 7, each G2 electrode overlaps with one and only one PS.

G2 electrodes can be made of parallel fine metal wires, metal wire cloth or net-shaped metal foil formed through perforation or etching. These electrodes are sandwiched between the two spacer plates SP1 and SP2. SP1 is placed between FFP and G2 electrodes. SP2 is placed between G2 electrodes and BFP. SP2 may further comprise fine isolation walls FIW between every pair of phosphor stripes PSs. These fine isolation walls FIW define a multitude of isolated tunnels. Each of these isolated tunnel is preferably overlapped and covered by one G2 electrode when viewed in the viewing direction shown in FIG. 7.

These isolation tunnels will physically restrict the trajectories of electrons passing through G2 electrodes and therefore guarantee minimum crosstalks between neighboring phosphor stripes PSs. Furthermore, supporting fins SF between neighboring FIWs may be formed to increase the strength of the fine isolation walls FIW and to reduce the chance for G2 electrodes to sag, vibrate, etc. Both spacer plates SP1 and SP2 can be made by technology such as the Fotoform Glass of Corning of the U.S.A.

The backlighting unit is divided into sub-chambers by spacer walls in SP1. The spaces within these sub-chambers are connected together through the connection tunnels CTs, etched in SP1 and SP2, to form one connected space as shown in FIG. 12. Preferably, the spacer walls of both SP1 and SP2 are tapered such that when these two spacer plates SP1 and SP2 are stacked together, forming substantainly smooth and wedge-shaped walls, as illustrated in FIG. 12, where the pointed side or edge of the wedge is placed abutting the FFP and the other end of the wedge is placed abutting the BFP. The contact surfaces between BFP, SP2, SP1 and FFP may be further reinforced by aplying adhesive means such as frit glass or other suitable high-temperature bounding material.

Vacuum chamber is formed by sealing the peripherals of these four plates: FFP, SP1, SP2 and BFP and by sealing off the out gassing tube OGT after the device is properly evacuated.

Alignment holes AH and alignment through hole ATH (only one of each shown) may be etched or drilled in the FFP, SP1, SP2 and BFP. By placing one or more alignment pins AP in these alignment holes, precise device assembly can be readily achieved. Surfaces of spacer walls in SP2 may be made either light absorbing or light reflecting through coating or through the use of material such as Fotoform Opal from Corning of the U.S.A. Thus processed SP2 surfaces will form a light guide to direct the light emitted by phosphor toward the FFP and reduce the lateral spread of the lights to improve the contrast of the display.

In order to produce smooth backlighting for the LCD front end, uniformity enhancement electrodes UEE made of transparent or reflective conductors may be placed on the front face plate FFP and the surfaces of SP1 and SP2. When positively energized, these UEE electrodes can create electric fields to spread out the electrons generated by cathode elements CE and therefore smooth out the lights produces by the backlighting unit.

The backlighting unit is separated into three sub-sections in each sub-chamber as defined by the walls in SP1. In operation, the backlighting unit is controlled such that backlight of color red (R) of intensity I1 is displayed by sub-section 1 then sub-section 2 and so on, and then backlight light of color blue (B) intensity I2 is displayed by sub-section 1 then sub-section 2 and so on. A possible configuration is for each sub-section to include three consecutive G2 electrodes covering a set of red, green and blue phosphor stripes and for corresponding G2 electrodes in each sub-chamber to be connected together to form a total of nine sets of G2 electrodes. When backlight of color blue (B) in a particular sub-section S is to be turned on, the cathode elements CEs in the corresponding sub-chamber will be turned on by applying a positive voltage to the gate electrode G or to the control block CB of those CEs inside the sub-section S, one of the nine sets of the G2 electrodes which overlaps the phosphor stripes responsible for generating lights of color blue (B) are also positively energized. All other sets of G2 electrodes are negatively energized. The cathode elements CEs in other sub-chamber are turned off by controlling the voltage applied to the gate electrode G or to the control block CB of CEs.

Both the design of cathode element CE and the operation synchronization between the LCD front end unit and the backlighting back end unit are identical to what have been described in embodiment 2. Please refer to proper sections in the discussion of embodiment 2 for more details.

Embodiment 4

This embodiment relates to embedded control circuits for direct matrixed FEA displays. Referring to FIGS. 12, 13, an implementation of a direct matrixed FEA display with embedded control circuit is illustrated. Like reference will designate like or corresponding parts throughout the discussion of this embodiment.

FIG. 13A is a perspective view of a general structure for the direct matrixed FEA display described in this embodiment. FIG. 5B is a general conceptual schema for the control circuit. FIG. 13B, FIG. 13C and FIG. 13D describe three examples of the control circuits.

An example of display device to be used with the illustrated cathode structure is shown in FIG. 13A, where the device is outlined by a transparent front face plate FFP and a back face plate BFP.

The inside surface of the FFP is further coated with a layer of transparent conductor as the anode A. A layer of phosphor dots or phosphor stripes PS is placed on or near the anode. The cathode is placed on the inside surface of the BFP. The cathode structure comprise a matrix of cathode dots CD. Each cathode dots CD comprises an array of field emitter tips, a gate electrode and a base electrode. A control circuit may be associated with one or more cathode dots CD to control the electron emission process of the cathode. In operation, the electrons generated by the cathode dots are projected and accelerated toward the anode and hit the phosphor dots or stripes. Light will be generated by the phosphors in response to the bombardment of electrons and images will be formed by these lighted phosphor dots. The image is controlled through the modulation of the rate of electron emissions of the matrix of the cathode dots CD.

The basic structure for the field emission cathode dots CD control circuit is illustrated in FIG. 5B, where the current emitted by the field emitters is collected in the base electrode B of the emitters and go through the current sensor IS. IS will produce a voltage signal to be used by the differential amplifier AMP at its negative input in a negative feedback loop to be compared to a signal S derived from the input signal Sig after preprocessed by a signal processing unit SP. According to the virtual ground principle of operational amplifier design theories, the signal at the two inputs to the amplifier AMP will be different from each other by a residual error e, which can be ignored when the gain a of AMP is sufficiently high. Under this condition, the relationship between the signal S and the current emitted by the field emitters can be related to each other by the transfer function of the current sensor IS. For example, if IS is a resistor, then the current to voltage relationship of IS will be $$I=V/R$$

and therefore the relationship between the signal S and the current emitted by the field emitter tips Itip will be:

$$Itip=S/R$$

The exact relationship will depend on the particular implementation of the control circuit but in general the emitted current will be closely related to the signal S through the transfer function of the current sensor IS. In this manner, the current emitted by the cathode dots can be clamped to a substantially constant value to maintain uniform brightness of the display.

The conceptual association between the control circuit and the display is as illustrated in FIG. 13A. As shown, the output signal of the amplifier AMP is connected to the gate of the field emitter tips of the cathode dot. The generated current is then collected at the base and sensed by sensor IS to produce a negative feedback. For clarity, all three example circuits FIG. 13B, FIG. 13C and FIG. 13D show 2-by-2 matrix of cathode dots where each of the cathode dots is represented as one emitter tip. It goes without saying that there are too many possible configurations to be exhaustively illustrated in this description. These examples are only used to illustrate the validity of the concept and the scope of the invention should be limited only by the conceptual schema set forth in FIG. 5B.

In all three examples, the cathode dots are arranged into two horizontal scan lines Scan N, Scan N+1 and two vertical signal lines Sin K and Sin K+1. Vgg and Vss are power supply voltages for the amplifier AMP.

In the example shown in FIG. 13B, the cathode dots are arranged in rows and columns, and all cathode dots in a column along a common vertical signal bus 100 in FIG. 13B share one control amplifier, comprising Q1, Q2 and R1, R2, R3. R1 is the current sensor. In operation, the scan lines Scan N and Scan N+1 is raised, in a one-by-one fashion, to a positive voltage to turn on the switches Q5 along the active scan line. When Q5 is turned on, base electrode B of the emitter is connected to the ground through resistor R1 and therefor form a feed back control circuit as described in FIG. 5B. The current emitted by the cathode dots along the active scan line can then be sensed by their respective R1 and controlled by their respective amplifier Q1, Q2. Along the inactive scan line, the switches Q5 are turned off, the base electrodes B are disconnected from the power source and the current emission process of the cathode dots are stopped. The effective duty factor for each cathode dots is 1/(number of scan lines).

In the preferred embodiment of the circuit shown in FIG. 13B, the switches Q5 should be embedded in the field emitter cathode structure through thin-film-transistor process or semiconductor process, both well know technologies. Components R1 is especially to the control of the emitted current and should be closely controlled. Techniques such as laser trimming can be used to obtain high-precision control of the value of R1. It would be preferable to implement these R1 along with the display panels but not necessarily within the cathode structure. For example, R1 can be formed on the BFP through thin-film coating process. The implementation of amplifier Q1, Q2 and R2, R3 are most flexible. These amplifiers can be implemented either within the cathode structure or in separated ICs.

In the example shown in FIG. 13C, each cathode dot contains its own amplifier Q1, Q2, R2, R3. A sample-hold type analog memory device is further formed by the use of Q3 and Cs. Resistor R1 is used as the current sensor. In operation, the scan lines Scan N and Scan N+1 is raised one by one to a high voltage to turn on the switch Q3. Along the active scan line, the signal carried in Sig K and Sig K+1 will then be stored in the Cs through switch Q3. The stored signal will then drive the amplifier Q1, Q2, R2, R3, which in turn will control the gate electrode G of the emitter to produce emitter current Itip. Compared to the circuit shown in FIG. 13B, due to the use of sample-hole memory, the effective duty factor of the cathode dots in this example is raised to be 1.

The circuit shown in FIG. 13D employs one additional transistor Q4 over the circuit shown in FIG. 13C. These transistor Q4 are connected to control buses Rst N, Rst N+1. The addition of Q4 allows the duty factor to be controlled in the following way. When Q4 is turned on, the function of the control circuit is essentially identical to that of the circuits shown in FIG. 13C. When Q4 is turned off, the output of the amplifier is pulled low and therefore shut off the emission of the cathode dots. By synchronizing the reset waveform of Rst N, Rst N+1 with that of the line scanning waveform of Scan N, Scan N+1, the duty factor can be controlled with great flexibility.

The preferred embodiment for the circuit shown in both FIG. 13C and FIG. 13D is to incorporate all the circuit components within the cathode structure.

While the invention has been described by reference to different embodiments, it will be understood that various modifications may be made without departing from the scope of the invention, which is to be limited only by the appended claims.

What is claimed is:

1. A display device for displaying images when viewed in a viewing direction, comprising:

a first and a second face plate;

a set of side walls or a set of spacer means, which together with the face plates, define a vacuum chamber therein;

an anode placed on or near the first face plate in the chamber;

cathodoluminescent means in the chamber on or near the anode, for generating light in response to bombardment of electrons;

a multitude of electron emitting cathode elements, each containing at least one control gate, at least one base electrode and at least one field emitter, on or near the second face plate;

means for applying voltage to the cathode elements to cause the elements to generate electrons forming an electron cloud;

control electrodes in two or more individual layers between the anode and the cathode to control and accelerate the free electrons generated by the cathode towards the anode and the cathodoluminescent means to cause the cathodoluminescent means to emit light for displaying images; and means for applying electrical potentials to the control electrodes such that electrons from the electron cloud are directed to selected locations of the cathodoluminescent means in selected quantities for displaying images at said desired locations of the desired brightness, said control electrodes being in two different layers between the face plates, the control electrodes in one layer each being transverse to and overlaps those in the other layer in overlapping areas when viewed in the viewing direction, each overlapping area between an electrode in one layer and another electrode in the other layer defining a pixel of the image.

2. The device of claim 1, said control electrodes and said electrical potentials applying means being such that electrons generated by at least one cathode element are directed towards said cathodoluminescent means at positions overlapping more than one pixel when viewed in said viewing direction.

3. The device of claim 1, wherein said anode is made of transparent conductive material and the image displayed is viewed through the transparent anode, said control electrodes in each layer being arranged in a substantially parallel array, wherein orientation of said control electrodes in one layer is substantially orthogonal to the orientation of electrodes in the other layer.

4. The device of claim 3, said device further comprising spacer means that includes wedge-shaped supporting walls between the two face plates, said walls having pointed ends pointed toward the anode.

5. The device of claim 3 said device having a total thickness of about 5 to 15 millimeters.

6. The device of claim 1, wherein at least one of said cathode elements further contains an embedded local circuit to control the electron emission of the field emitters.

7. The device of claim 6, wherein said embedded local circuit produces a control signal controlling the gate of the field emitters.

8. The device of claim 6, wherein said embedded local circuit of said at least one cathode element contains at least some of the following components: current sensors, amplifiers, feedback control loops, analog or digital memories, switches, resistors and capacitors.

9. The device of claim 1, wherein at least one of said cathode elements has a width or length less than about 2 millimeters.

10. The device of claim 1, wherein the cathode elements are arranged in a plane, and wherein average spacing between adjacent cathode elements is in a range of about 5 to 25 millimeters.

11. The device of claim 1, wherein said cathode elements contain cone shaped emitters, or lateral type field emitters or a mixture of both.

12. The device of claim 11, wherein the lateral type field emitters have their emitter tips pointing at different directions in order to avoid concentration of emitted electrons and create a more omnidirectional electron source.

13. The device of claim 1, wherein said cathode elements are disposed on one face plate having a total area, and area occupied by said cathode elements is less than about 10% of the total area of the face plate.

14. The device of claim 1, further comprising conductive means connected to the cathode elements made of a transparent conductive material or a metal.

15. A display device for displaying images when viewed in a viewing direction, comprising:

a first and a second face plate;

a set of side walls or a set of spacer means, which together with the face plates, define a vacuum chamber therein;

an anode placed on or near the first face plate in the chamber;

cathodoluminescent means in the chamber on or near the anode, for generating light in response to bombardment of electrons;

a multitude of electron emitting cathode elements, each containing at least one control gate, at least one base electrode and at least one field emitter, on or near the second face plate;

means for applying voltage to the cathode elements to cause the elements to generate electrons forming an electron cloud;

control electrodes in two or more individual layers between the anode and the cathode to control and accelerate the free electrons generated by the cathode towards the anode and the cathodoluminescent means to cause the cathodoluminescent means to emit light for displaying images; and means for applying electrical potentials to the control electrodes such that electrons from the electron cloud are directed to selected locations of the cathodoluminescent means in selected quantities for displaying images at said desired locations of the desired brightness, said device further comprising spacer means having a surface and a multitude of uniformity enhancement electrodes, made of transparent or metal conductors on the surface of one of the face plates or the surface of the spacer means, and means for positively energizing said uniformity enhancement electrodes to create electric fields to spread out the electrons generated by the cathodes.

16. A display device for displaying images when viewed in a viewing direction, comprising:

a first and a second face plate;

a set of side walls or a set of spacer means, which together with the face plates, define a vacuum chamber therein;

an anode placed on or near the first face plate in the chamber;

cathodoluminescent means in the chamber on or near the anode, for generating light in response to bombardment of electrons;

a multitude of electron emitting cathode elements, each containing at least one control gate, at least one base electrode and at least one field emitter, on or near the second face plate;

means for applying voltage to the cathode elements to cause the elements to generate electrons forming an electron cloud;

control electrodes in two or more individual layers between the anode and the cathode to control and accelerate the free electrons generated by the cathode towards the anode and the cathodoluminescent means to cause the cathodoluminescent means to emit light for displaying images; and means for applying electrical potentials to the control electrodes such that electrons from the electron cloud are directed to selected locations of the cathodoluminescent means in selected quantities for displaying images at said desired locations of the desired brightness, wherein at least one of the cathode elements further comprises an uniformity enhancement electrode and means for positively energizing said uniformity enhancement electrode to create an electric field so as to diffuse the electrons emitted by the emitter tip.

17. The device of claim 1, further comprising spacer means that includes multiple wedge-shaped supporting walls between the two face plates, and adhesive means attaching said supporting walls to said face plates.

18. The device of claim 17, said spacer means further comprising isolation walls and supporting fins between and connecting said isolation walls, to reduce crosstalk.

19. The device of claim 17, wherein said spacer means and said face plates define alignment holes therein in matching positions, said device further including alignment pins in these alignment holes to assure precise assembly of the device.

20. A display device for displaying images when viewed in a viewing direction, comprising:

a first and a second face plate;

a set of side walls or a set of spacer means, which together with the face plates, define a vacuum chamber therein;

an anode placed on or near the first face plate in the chamber;

cathodoluminescent means in the chamber on or near the anode, for generating light in response to bombardment of electrons;

an array of electron emitting cathode elements, each containing at least one control gate, at least one base electrode and at least one field emitter, on or near the second face plate;

means for applying voltage to the cathode elements to cause the elements to generate electrons forming an electron cloud;

control electrodes between the anode and the cathode elements to control and accelerate the free electrons generated by the cathode towards the anode and the cathodoluminescent means to cause the cathodoluminescent means to emit light for displaying images in more than one scanned area, each scanned area overlapping and corresponding to one of the control electrodes when viewed in a viewing direction; and means for applying electrical potentials to the control electrodes such that electrons from each cathode element are directed to more than one scanned area of the cathodoluminescent means corresponding to more than one control electrode in selected quantities for displaying images at said scanned areas of the desired brightness.

21. The device of claim 20, wherein said cathode elements are disposed on one face plate having a total area, and area occupied by said cathode elements is less than about 10% of the total area of the face plate.

* * * * *